(12) United States Patent
Kinsely et al.

(10) Patent No.: US 11,907,244 B2
(45) Date of Patent: Feb. 20, 2024

(54) MODIFYING FIELD DEFINITIONS TO INCLUDE POST-PROCESSING INSTRUCTIONS

(71) Applicant: SPLUNK INC., San Francisco, CA (US)

(72) Inventors: Michael Kinsely, San Francisco, CA (US); Alex Raitz, San Francisco, CA (US); John Robert Coates, San Francisco, CA (US); Shirley Wu, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 44 days.

(21) Appl. No.: 17/809,837

(22) Filed: Jun. 29, 2022

(65) Prior Publication Data

US 2022/0327137 A1    Oct. 13, 2022

Related U.S. Application Data

(63) Continuation of application No. 15/885,809, filed on Jan. 31, 2018, now Pat. No. 11,392,604, which is a continuation of application No. 14/266,797, filed on Apr. 30, 2014, now Pat. No. 9,922,102.

(60) Provisional application No. 61/934,446, filed on Jan. 31, 2014, provisional application No. 61/860,761, filed on Jul. 31, 2013.

(51) Int. Cl.
G06F 16/00     (2019.01)
G06F 7/00      (2006.01)
G06F 16/25     (2019.01)

(52) U.S. Cl.
CPC ................. *G06F 16/254* (2019.01)

(58) Field of Classification Search
CPC . G06F 16/254; G06F 16/2428; G06F 16/2443
USPC ........................................................ 707/779
See application file for complete search history.

(56) References Cited

U.S. PATENT DOCUMENTS

| 8,620,079 B1 | 12/2013 | Rubio et al. |
| 8,620,928 B1 | 12/2013 | Walton |
| 2006/0167860 A1* | 7/2006 | Eliashberg .............. H04L 67/55 |
| 2006/0195427 A1 | 8/2006 | Kilroy |

(Continued)

OTHER PUBLICATIONS

U.S. Appl. No. 15/885,809, filed Jan. 31, 2018, Patented.

(Continued)

*Primary Examiner* — Raquel Perez-Arroyo
(74) *Attorney, Agent, or Firm* — Shook, Hardy & Bacon L.L.P.

(57) ABSTRACT

A field extraction template simplifies the creation of field extraction rules by providing a user with a set of field names commonly assigned to a certain type of data, as well as guidance on how to extract values for those fields. These field extraction rules, in turn, facilitate access to certain "chunks" of the data, or to information derived from those chunks, through named fields. A field extraction template comprises at least a set of field names and ordering data for the field names. The ordering data indicates index positions that are associated with at least some of the field names. A delimiter is specified for splitting data items into arrays of chunks. The chunk of a data item that belongs to a given field name is the chunk whose position within the item's array of chunks is equivalent to the index position associated with the given field name.

20 Claims, 15 Drawing Sheets

(56) References Cited

U.S. PATENT DOCUMENTS

| | | |
|---|---|---|
| 2007/0226754 A1 | 9/2007 | Grabarnik et al. |
| 2010/0223499 A1 | 9/2010 | Panigrahy et al. |
| 2011/0153575 A1 | 6/2011 | Glasser et al. |
| 2011/0035390 A1 | 10/2011 | Whitehouse |
| 2012/0197914 A1 | 8/2012 | Harnett et al. |
| 2013/0232157 A1 | 5/2013 | Kamel |
| 2014/0019458 A1 | 1/2014 | Walton |
| 2014/0143661 A1 | 5/2014 | Carreno-Fuentes et al. |
| 2014/0282031 A1 | 9/2014 | Hinterbichler et al. |
| 2014/0365535 A1 | 12/2014 | Dean et al. |

OTHER PUBLICATIONS

U.S. Appl. No. 14/266,797, filed Apr. 30, 2014, Patented.
U.S. Appl. No. 61/860,761, filed Jul. 31, 2013, Expired.
U.S. Appl. No. 61/934,446, filed Jan. 31, 2014, Expired.

\* cited by examiner

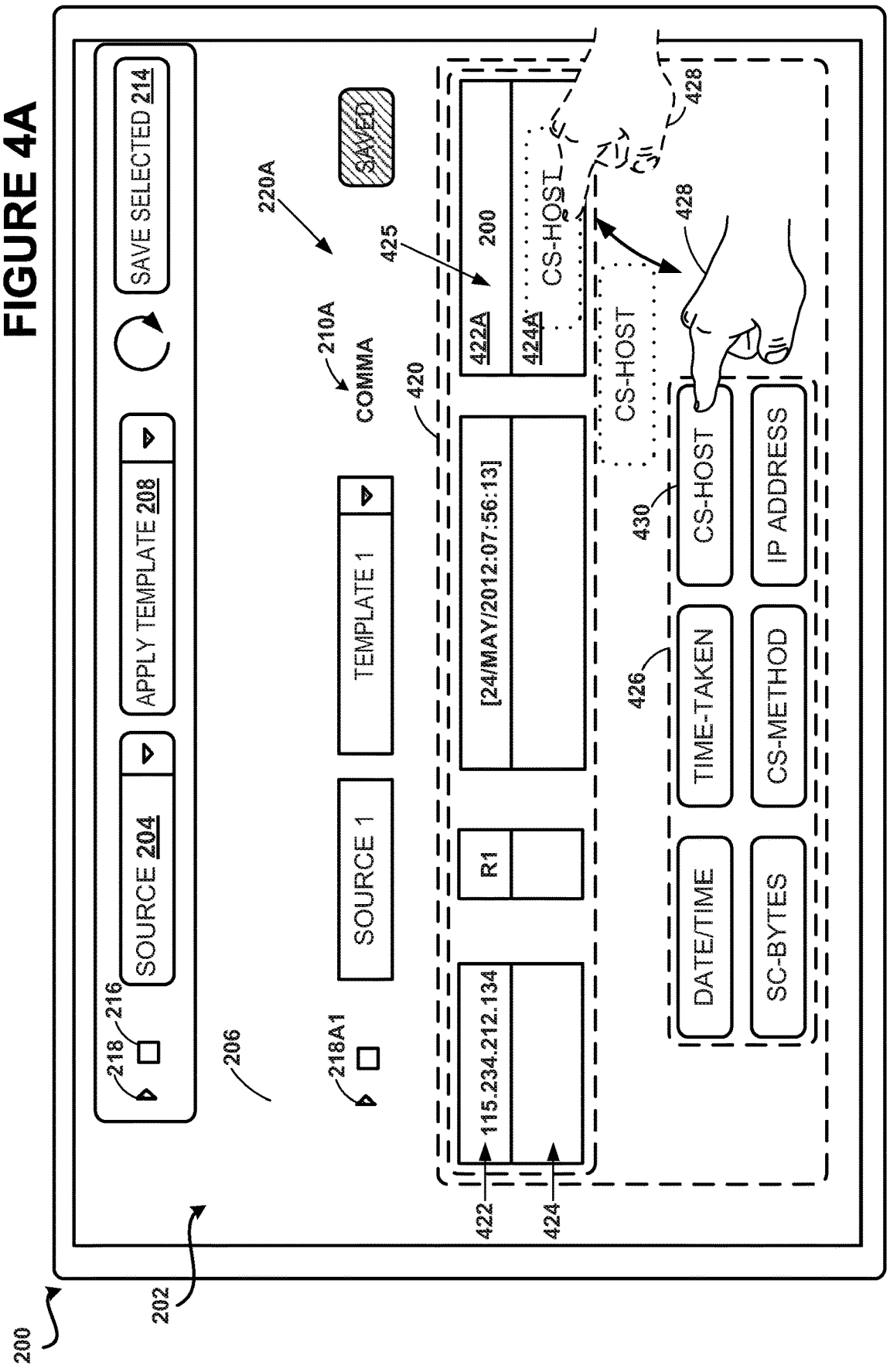

Original search: 901
search "error" | stats count BY host

Sent to peers: 902
search "error" | prestats count BY host

Executed by search head: 903
Merge the prestats results received from peers (reduce)

FIG. 9

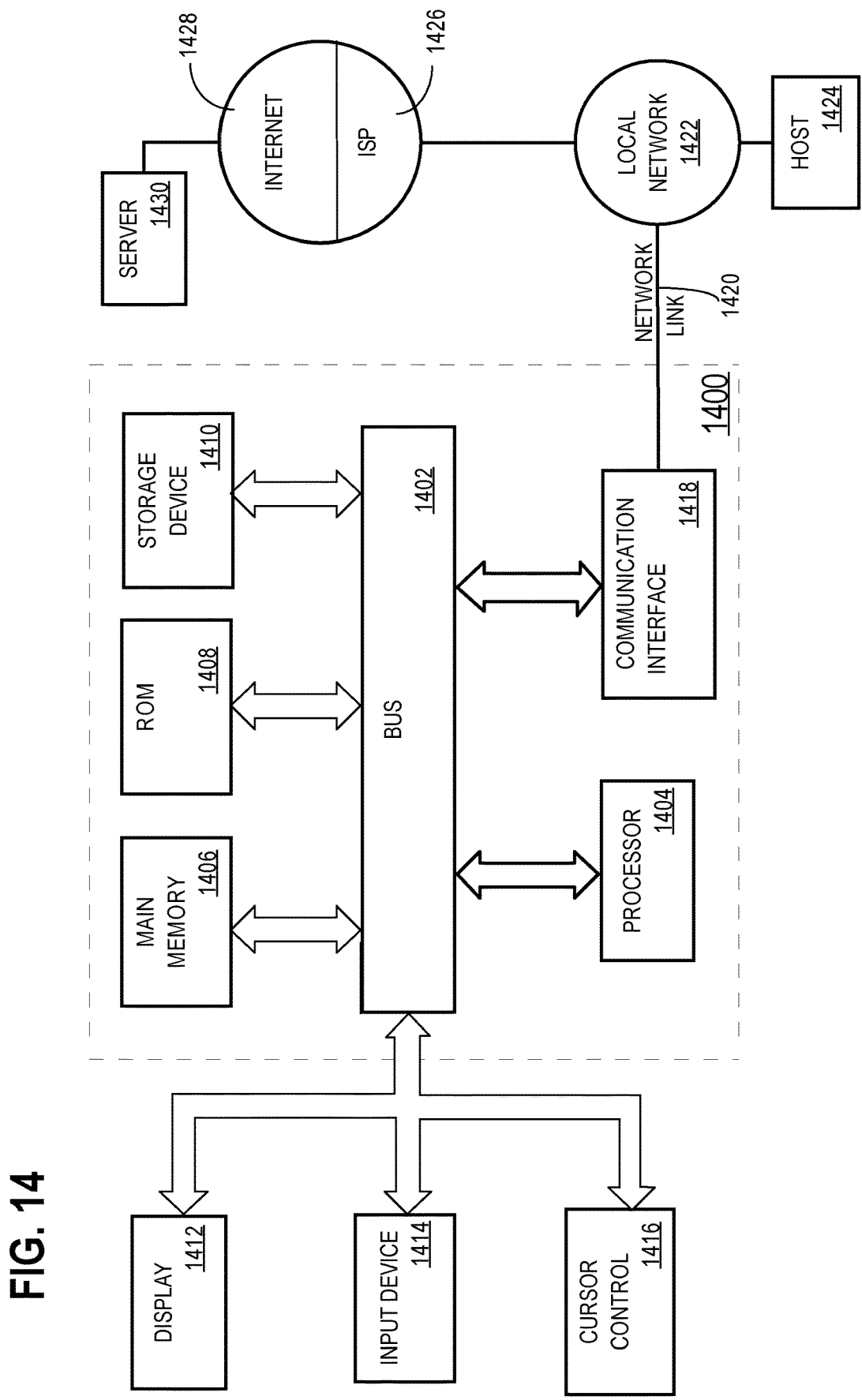

MODIFYING FIELD DEFINITIONS TO INCLUDE POST-PROCESSING INSTRUCTIONS

CROSS-REFERENCE TO RELATED APPLICATIONS; BENEFIT CLAIM

This application is a Continuation of application Ser. No. 15/885,809, filed Jan. 31, 2018, which itself claims the benefit as a Continuation of application Ser. No. 14/266,797, filed Apr. 30, 2014, which claims the benefit under 35 U.S.C. § 119(e) of U.S. Provisional Application No. 61/934,446, filed Jan. 31, 2014, and also claims the benefit under 35 U.S.C. § 119(e) of U.S. Provisional Application No. 61/860,761, filed Jul. 31, 2013. The entire contents of the aforementioned are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to data processing and analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There is tremendous growth in the amount of data generated in the world. For many years, much of this data was processed prior to being stored for analysis, based on anticipated data analysis needs. For instance, the data may have been summarized and/or converted from rawer formats to refined formats. Many aspects of the data were essentially discarded during pre-processing tasks. With decreasing storage costs and seemingly infinite capacity due to cloud services, there are fewer reasons to discard old data, and many reasons to persistently keep it. As a result, challenges have shifted from pre-processing data prior to storage and analysis, towards analyzing massive quantities of minimally processed data in rawer formats.

Mining a single massive dataset is non-trivial, but an even more challenging task is to cross-correlate and mine multiple datasets from various sources. For example, a datacenter may monitor data from thousands of components. The log formats and collection granularities of that data vary by component type and generation. Another challenge is that a large fraction of the world's data is considered to be "unstructured," making it difficult to index and query using traditional database systems. Even if a dataset is considered to be structured, the specifics of the structure may evolve with time, for example, as a consequence of system upgrades or more/less restrictive data collection/retention policies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

In the drawings:

FIGS. 4A and 4B are interface diagrams showing aspects of a field preview area in an interface used to define fields, in accordance with some embodiments;

FIG. 9 illustrates an example of a search query received from a client that the search head can split into two parts, according to an embodiment of the invention;

FIG. 14 is a block diagram that illustrates a computer system upon which embodiments of the invention may be implemented.

DETAILED DESCRIPTION

Figure 1:
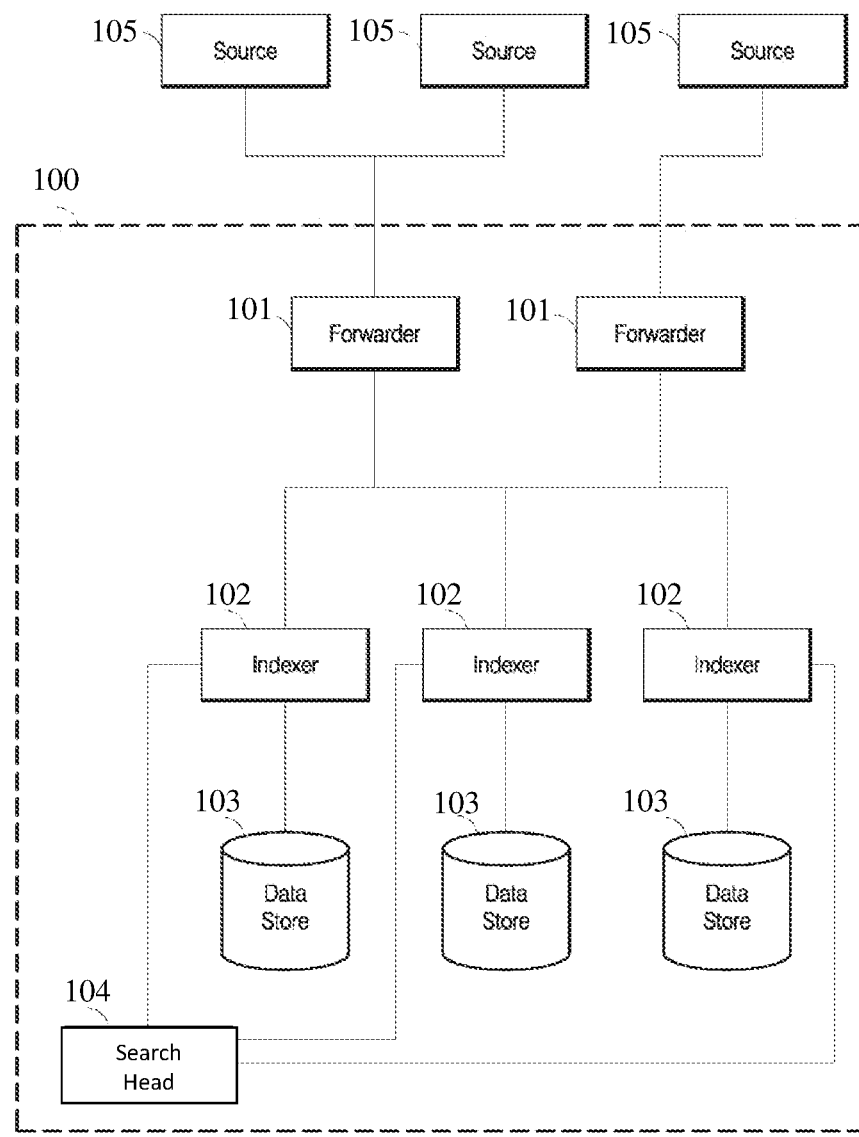
FIG. 1 illustrates an example block diagram of a data intake and query system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. System Overview
    2.1. Example Data Server System
    2.2. Example Field Extraction Subsystem
    2.3. Example Template-Based Field Extraction System
    2.4. Example Field Extraction Generation Subsystem
3.0. Functional Overview
4.0. Field Definition Interfaces
    4.1. Illustrative Interface
    4.2. Method for Using a Field Definition Interface
5.0. Example Embodiments
6.0. Hardware Overview

1.0. General Overview

According to an embodiment, a data server system utilizes field extraction templates to assist users in obtaining access to data in a data repository. A field extraction template simplifies the creation of field extraction rules by providing a user with a set of field names commonly assigned to a certain type of data, as well as guidance on how to extract values for those fields. These field extraction rules, in turn, facilitate access to certain portions of the data, referred to herein as chunks, or to information derived from those chunks, through named fields, even when those fields were not defined for the data when the data was initially stored.

Each field extraction rule associates a named field with logic comprising one or more instructions for extracting, from individual data items within the data repository, chunks of data that correspond to the named field. Examples of such instructions may include, for instance, regular expressions or other search patterns, formulas, or any suitable computer code. An extracted chunk of data may be identified as a value for the named field. Or, in an embodiment, a field extraction rule may further include instructions for deriving values from extracted chunks of data by, for example, manipulating the chunks of data.

A field extraction template comprises at least a set of field names and ordering data for the set of field names. The ordering data indicates index positions that are associated with at least some of the field names in the template, and thus yields an arrangement of the field names relative to any ordered set of data, such as an array of data chunks. For example, a first field name may be assigned to an index position of one, a second field name may be assigned to an index position of three, and so forth. A delimiter is specified for splitting a data item into an array of chunks. The delimiter may be, for example, a specific set of one or more characters, such as a comma, white space, tab, colon, semi-colon, pipe symbol, and so forth. The chunk of the data item that belongs to a given field name is the chunk whose position within the array is equivalent to the index position associated with the given field name.

For example, suppose that the ordering data within a template associated a field named "color" with a third index position. Further suppose that a "comma" delimiter had been specified for the template. In the data item "12-10-2009, 10.0.0.1,red,25,2.99", the value of "red" would be said to belong to the field named "color." According to the techniques described herein, an extraction rule would be generated based on the template and the delimiter, by which the third chunk in each of a plurality of data items would likewise be extracted as the value for the "color" field with respect to those data items.

In an embodiment, the field names in a template may further be associated with one or more transformation instructions. Based on the transformation instruction(s), the extracted chunk is converted into the value that should be derived for the corresponding field. For instance, a transformation instruction may truncate a chunk, apply a formula to the chunk, convert the chunk's value into a standard format, and/or perform any other suitable operation on the chunk to derive a value. The one or more transformation instructions may be included in the extraction rule for the corresponding field.

In an embodiment, a user interface is provided to assist in defining the field extraction rules through the field extraction templates. The user interface allows a user to select a template, select and/or modify a delimiter to associate with the template, and generate field extraction rules based on the selections. In various embodiments, the user interface may further include controls for modifying some or all of the ordering data from a template, add additional field names, define transformations or other post-processing instructions, preview application of the field extraction rules on one or more example data items, and/or save new templates. The field extraction rules generated via the user interface may be saved for future use in executing search queries on the data items. Or, the templates themselves may be saved, and the field extraction rules may be generated dynamically based on the templates as needed during search query execution.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. System Overview

The techniques described herein may be performed in a variety of types of data server systems. Generally, a data server system is a system that performs data operations with respect to data stored in one or more repositories of data. Depending on the type of data server system, the data operations may range from simple operations, such as storing and retrieving the data, to more complex operations such as calculating statistics based on the data, and/or arranging or formatting the data. One example of a data server system is a relational database system, in which data is stored in highly structured tables, and accessed through rigid schemas. Another example of a data server system is a file system, such as a Network File System server. Yet another example of a data server system is a web application server.

Another example of a data server system is an event-based system, such as the SPLUNK® ENTERPRISE software produced and sold for on-premise and cloud use by Splunk Inc. of San Francisco, CA SPLUNK® ENTERPRISE is a comprehensive system that generates, stores, retrieves, and searches event data. SPLUNK® ENTERPRISE has gained particular appeal in the market for deriving events from unstructured data and machine data. It is the leading software for providing real-time operational intelligence, enabling organizations to collect, index, and harness machine-generated big data coming from the websites, applications, servers, networks, mobile devices, etc., that power their businesses.

In some event-based systems, data is derived from lines or rows of unstructured time-series data. Some of the many examples of such data include web logs and machine logs. Each row (or a group of rows) is generally associated with a timestamp and a series of one or more associated data points or parameter-value pairs. Based on the timestamps, data structures known as events are derived from the associated data, and include a portion of the associated data. A variety of event types may be derived from such data. For example, in the context of web logs, events may be derived for errors, specific user inputs, navigation events, and so forth. Some event-based systems feature flexible schemas that may be redefined as needed, or even at the time that a request to perform an operation is received. Such a schema indicates how to extract one or more pieces of data from the associated data included in an event For example, at a high level, SPLUNK® ENTERPRISE can take raw data, unstructured data, or machine data such as data in Web logs, syslogs, sensor readings, etc., divide the data up into portions, and optionally transform at least part of the data in these portions to produce time-stamped events. The software derives the time stamp for each event by extracting it from the event data itself or by interpolating an event's time stamp relative to other events for which the software can derive a time stamp. SPLUNK® ENTERPRISE then stores the events in a time-series data store against which it can run queries to retrieve events that meet specified criteria, such as having certain keywords and/or having certain value(s) for certain defined field(s).

Certain techniques described herein may be particularly useful in data server systems that employ so-called "late-binding schemas." For example, SPLUNK® ENTERPRISE is particularly noteworthy for its implementation of late-binding schemas. As noted, an event is a data item that typically contains a portion of raw data (or a transformed version of such). To run certain types of queries against these and other data items, a schema can be developed. A schema includes field definition data that defines a set of named fields, or properties, for which each data item in a repository may have a value. In many data server systems, the schema is pre-defined, such that data items are stored in a refined format (e.g. a relational table) that is optimized for access using semantics defined by the schema. A late-binding schema, by contrast, is not necessarily pre-defined when data items are stored. Rather, the field definition data in a late-binding schema includes extraction rules for deriving values for the fields from a rawer format that is not necessarily optimized for access using the semantics of the schema.

The extraction rule for a field is logic comprising one or more instructions that specify how to extract a value from each of a subset of data items for which the field has been defined. The extraction rule for a field is often defined using a regular expression ("regex" rule) or other search pattern, but can also or instead include any suitable type of instruction for locating, in each data item, a chunk of the data item that corresponds to the field. The located chunk may be the value of the field for the data item, or the extraction rule may further include processing instructions to derive the value from the chunk through one or more transformation or conversion operations.

In an embodiment, in certain data server systems, such as SPLUNK® ENTERPRISE, a late-binding schema is not defined at index time as with conventional database technology. Rather, in a system involving late-binding schema, the schema can be developed on an ongoing basis up until the time it needs to be applied. In some embodiments, a late-binding schema is not applied until the time that a query is actually executed. For instance, the query may specify the criteria for data items of interest, in terms of data items having specified value(s) for specified field(s). Extraction rule(s) for the specified field(s) may be provided in the query, or located during execution of the query, and a field extractor may use the extraction rules to dynamically derive values from any data items involved in the query during execution of the query. As a data analyst learns more about the data in stored events, using a late-binding schema, he or she can continue to develop the schema up until the next time it is needed for a query. Hence, for example, a field for the same data items may have different values for different queries, and/or new fields may become available for the data items, based on a changing schema.

Because SPLUNK® ENTERPRISE maintains the underlying searchable raw data and enables application of a late-binding schema, it has great power to enable dynamic investigation of issues that arise as a data analyst learns more about the data stored in the system's events. Consequently, some of the techniques described herein are described with respect to an example SPLUNK® ENTERPRISE. However, it will be apparent that the techniques are equally applicable to data server systems that do not necessarily comprise all of the features of SPLUNK® ENTERPRISE.

As discussed herein, "time-series data" and "time-series machine data" may include, among other elements, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. As used herein, "unstructured" data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. The visualization of such time-series data may be used to display statistical trends over time. The time-series machine data collected from a data source may be segmented or otherwise transformed into discrete events, where each event can be associated with a timestamp.

An "event" may include a single record of activity from a particular data source associated with a single timestamp. Such an event may correspond to, for example, one or more lines in a log file or other data input. Further, "events" may be derived from processing or indexing machine data, as described herein, or may include other kinds of events or notable events described herein. Events can also correspond to any time-series data, such as performance measurements of an IT component (e.g., a computer cluster, node, host, virtual machine, etc.), a sensor measurement, etc. For convenience, some of the techniques described herein are described with respect to events. However, it should be understood that, unless otherwise apparent, the techniques described herein may be equally applicable to any type of data item, including data items that do not include a time element.

In an example, a field extractor within an enterprise network environment may be configured to automatically identify (e.g., using regular expression-based rules, delimiter-based rules, etc.) certain fields in the events while the events are being created, indexed, and/or stored. Alternatively, one or more fields can be identified within the events and added to the field extraction rules (used by the field extractor to identify fields within the events) by a user using a variety of techniques. Additionally, fields that correspond to metadata about the events, such as a timestamp, host, source, and source type for an event, may also be created automatically. Such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

In some embodiments, data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, sensors, etc. The types of data generated by such data sources may be in various forms including, for example and without limitation, server log files, activity log files, configuration files, messages, network packet data, performance measurements or metrics, sensor measurements, etc.

2.1. Example Data Server System

FIG. 1 shows a block diagram of an example data intake and query system 100, similar to that found in SPLUNK® ENTERPRISE. Generally, the system 100 includes one or more forwarders 101 that collect data received or retrieved from a variety of different data sources 105, and one or more indexers 102 that store, process, and/or perform operations with respect to the data. The forwarders 101 determine which indexer or indexers 102 are to receive the collected data and forward the data to one or more indexers 102. The data typically includes streams of time-series data. In this context, time-series data refers to any data that can be segmented such that each segment can be associated with a time stamp. The data can be structured, unstructured, or semi-structured, and can come from files and directories. In this context, unstructured data is data that is not organized to facilitate the extraction of values for fields from the data, as is often the case with machine data and web logs, two popular data sources for SPLUNK® ENTERPRISE. Alternatively, certain forwarders 101 referred to as "heavy forwarders" can strip out extraneous data and detect time stamps for the data. Based on the time stamps, the heavy forwarders can index and group the data into buckets that fall within a common time span. The heavy forwarders then determine which indexer or indexers 102 are to receive each bucket of data and forward the data to one or more indexers 102.

Figure 7:
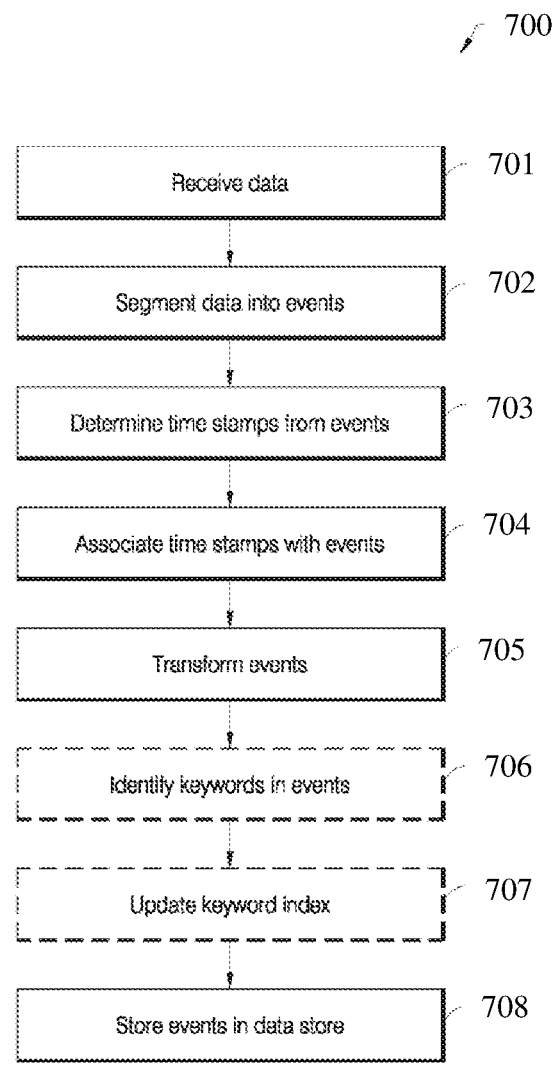
FIG. 7 illustrates a flowchart of a process that indexers may use to process, index, and store data received from forwarders, according to an embodiment of the invention.

FIG. 7 is a flowchart 700 of a process that an indexing component, such as indexers 102, may use to process, index, and store data received from forwarders, such as the forwarders 101. At block 701, an indexer receives data from a forwarder. At block 702, the indexer segments the data into events. The data typically consists of many lines of text that are separated by a carriage return or line break. An event may consist of one or more of these lines. The task of the indexer is to determine where an event begins and ends in the lines of data. The indexer can use heuristics that allow it to automatically determine how many lines constitute an event. The indexer may be informed of the source of the data and have a set of heuristic rules for the source. The indexer may also be able to examine a sampling of the data and automatically determine the source of the data and have a set of heuristic rules for that source. These heuristics allow the indexer to use regular expression-based rules, delimiter-based rules, etc., to examine the text in each line in order to combine lines of data to form an event. The indexer can examine the text for event boundaries within the text that include, but are not limited to: predefined characters, character strings, etc. These may include certain punctuation marks or special characters including, for example, carriage returns, tabs, spaces, line breaks, etc. In some instances, a user can fine tune or configure the rules that the indexers use to examine the text in order to adapt to the user's equipment.

The indexer determines a time stamp for each event at block 703. The time stamp can be determined by extracting the time from data in the event, or by interpolating the time based on time stamps from other events. In some cases, a time stamp can be determined from the time the data was received or generated. The indexer associates the time stamp with each event at block 704. For example, the time stamp may be stored as metadata for the event.

At block 705, the data included in a given event can be transformed. Such a transformation can include such actions as removing part of an event (e.g., a portion used to define event boundaries, extraneous text, characters, etc.) or removing redundant portions of an event. A user can specify a portion to remove using a regular expression or any similar method.

Optionally, a keyword index can be built to facilitate fast keyword searching of events. To build such an index, in block 706, the indexer identifies a set of keywords contained in the events. At block 707, the indexer includes each identified keyword in an index, which associates with each stored keyword pointers to each event containing that keyword (or locations within events where that keyword is found). When an indexer receives a keyword-based query, the indexer can then consult this index to quickly find those events containing the keyword without having to examine again each individual event, thereby greatly accelerating keyword searches.

In an embodiment, the keyword index may further include entries for name-value pairs found in events (e.g. a pair of keywords or other tokens connected by a certain symbol, such as an equals ("=") sign or colon). Certain combinations of name-value pairs may be indexed, so that events having those combinations may be quickly located. In an embodiment, fields may automatically be generated for some or all of the name-value pairs at the time of indexing. For example, if the string "dest=10.0.1.2" is found in an event, a field named "dest" may be created for the event, and assigned a value of "10.0.1.2."

The indexer stores events in a data store at block 708. The data can be stored in working, short-term and/or long-term memory in a manner retrievable by query. The time stamp can be stored along with each event to help optimize searching the events by time range.

In some instances, the stored data includes a plurality of individual storage buckets, each corresponding to a time range. An event can then be stored in a bucket associated with a time range inclusive of the event's time stamp. This not only optimizes time-based searches, but it can allow events with recent time stamps that may have a higher likelihood of being accessed to be stored at preferable memory locations that lend to quicker subsequent retrieval (such as flash memory instead of hard disk media).

Data stores 103 may be distributed across multiple indexers, each responsible for storing and searching a subset, or buckets, of the events generated by the system. By distributing the time-based buckets among the indexers, the indexers can find events responsive to a query in parallel using map-reduce techniques, each returning their partial responses for specific buckets to the query to a search head that combines the results together to answer the query.

Figure 8:
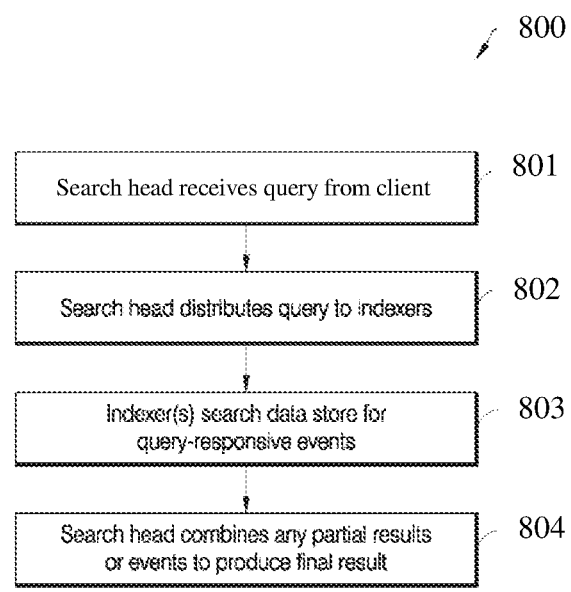
FIG. 8 illustrates a flowchart of a process that a search head and indexers may perform during a typical search query, according to an embodiment of the invention.

FIG. 8 is a flowchart 800 of a process that a search head 104 and indexers 102 may perform during an example search query. At block 801, a search head receives a query from a client.

At block 802, the search head is responsible for analyzing the search query to determine what part can be delegated for execution by indexers and what part needs to be executed by the search head. Streaming commands can be trivially delegated to the indexers. Conversely, aggregating commands are more complex to distribute.

The search head can perform optimization steps in order to make the search more efficient. As mentioned above, the indexers may create an index of keywords. In one optimization, before the search starts executing, the search head determines the time range required for the search and a set of common keywords that all matching events must have. The retrieval phase uses these parameters to query the indexers for a superset of the eventual results. The indexers return the superset of results that the search head can perform a filtering stage on. The filtering stage performs field extraction on the superset to arrive at a reduced set of search results.

In another optimization, to achieve better computation distribution and minimize the amount of data transferred between indexers and the search head, many aggregating commands implement a map operation which the search head can delegate to the indexers, while executing the reduce operation locally. FIG. 9 shows an example of a search query 901 received from a client that the search head can split into two parts: a "map" part, comprising a number of subtasks (e.g. data retrieval or simple filtering) that may potentially be performed in parallel, that are "mapped" to indexers 902 for execution, and a "reduce" part to be executed by the search head 903 as results are collected from the indexers 902. Here, the search query 901 makes the indexers responsible for counting the results by host and then sending their results to the search head. The search head 903 then performs the merging. This achieves both computation distribution and minimal data transfer.

The search head 903 distributes the search query 902 to one or more distributed indexers. The search queries 901 and 902 may contain one or more criterions for the data to be searched or operations on portions of the data that meet the criteria. These queries may also contain one or more names that each reference a field (which is in turned defined by an extraction rule), as well as criteria that must be met for the values for that field or operations on the values for the field.

At block 803, one or more indexers to which the query was distributed search their data store(s) for events responsive to the query. To determine events responsive to the query, a searching indexer finds events specified by the criteria in the query. This criteria can include that the events that have particular keywords or contain specified value(s) for specified field(s). In embodiments that employ a late-binding schema, block 803 may comprise the extraction of values from events for specified fields, at the time the query is processed, in order to determine events that meet the specified criteria. It should be appreciated that, to achieve high availability and to provide for disaster recovery, events may be replicated in multiple data stores, in which case indexers that have access to the redundant events but are not assigned as the primary indexer for those events would not respond to the query by processing the redundant events.

In an example, the indexer finds events for which it is the primary indexer that fall within a block of time specified by the criteria. The indexer then processes the contents of the events using the one or more regular expressions, extracting information associated with fields specified by the one or more regular expressions. The indexers can either stream the relevant events back to the search head, or use the events to calculate a partial result responsive to the query, and send the partial result back to the search head. At block 804, the search head combines or reduces all of the partial results or events received from the parallel processing indexers together to determine a final result responsive to the query.

In an embodiment, data intake and query system 100 may be configured to operate in a variety of different search modes. For example, one search mode involves streaming results back to a client in real time as they are identified. Another search mode involves waiting to report results to the client until a complete result is ready to return to the client. Yet another search mode involves streaming interim results back to the client in real-time until a complete result is ready, and then returning the complete result. In an embodiment, certain types of results may be stored for an amount of time at the system 100 as "search jobs," so that a client may retrieve the results by referencing the search job.

Data intake and query system 100 and the processes described with respect to FIGS. 1, 7, 8, and 9 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series database. In SLAML, 2010. Each of these references is hereby incorporated by reference in its entirety for all purposes.

In an embodiment, rather than reorganizing or converting the data based on the named fields, certain techniques described herein keep the data in the form it was initially stored. The field extraction rules are applied dynamically, at the time of a user's query, thus preserving the data in its initial form for future analysis. For instance, it may in the future become necessary to redefine the fields and/or create new fields. Because the data is stored in its original form, fields may easily be redefined as needed, and may even differ from one query to another. However, in other embodiments, the data may be permanently reorganized based on the field extraction rules and/or temporary tables or other structures may be created based on field extraction rules to speed up access to the named fields.

In an embodiment, a data server system such as SPLUNK® ENTERPRISE can accelerate some queries used to periodically generate reports that, upon each subsequent execution, are intended to include updated data. To accelerate such reports, a summarization engine periodically generates a summary of data responsive to the query for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then a summarization engine can periodically create a non-overlapping intermediate summary covering new data obtained during a recent, non-overlapping time period and stores the summary in a summary data store.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

Search and report acceleration methods are described in U.S. Pat. No. 8,589,403, issued on Nov. 19, 2013, and U.S. Pat. No. 8,412,696, issued on Apr. 2, 2011, both of which are hereby incorporated by reference in their entirety for all purposes.

2.2. Example Field Extraction Subsystem

Figure 10:
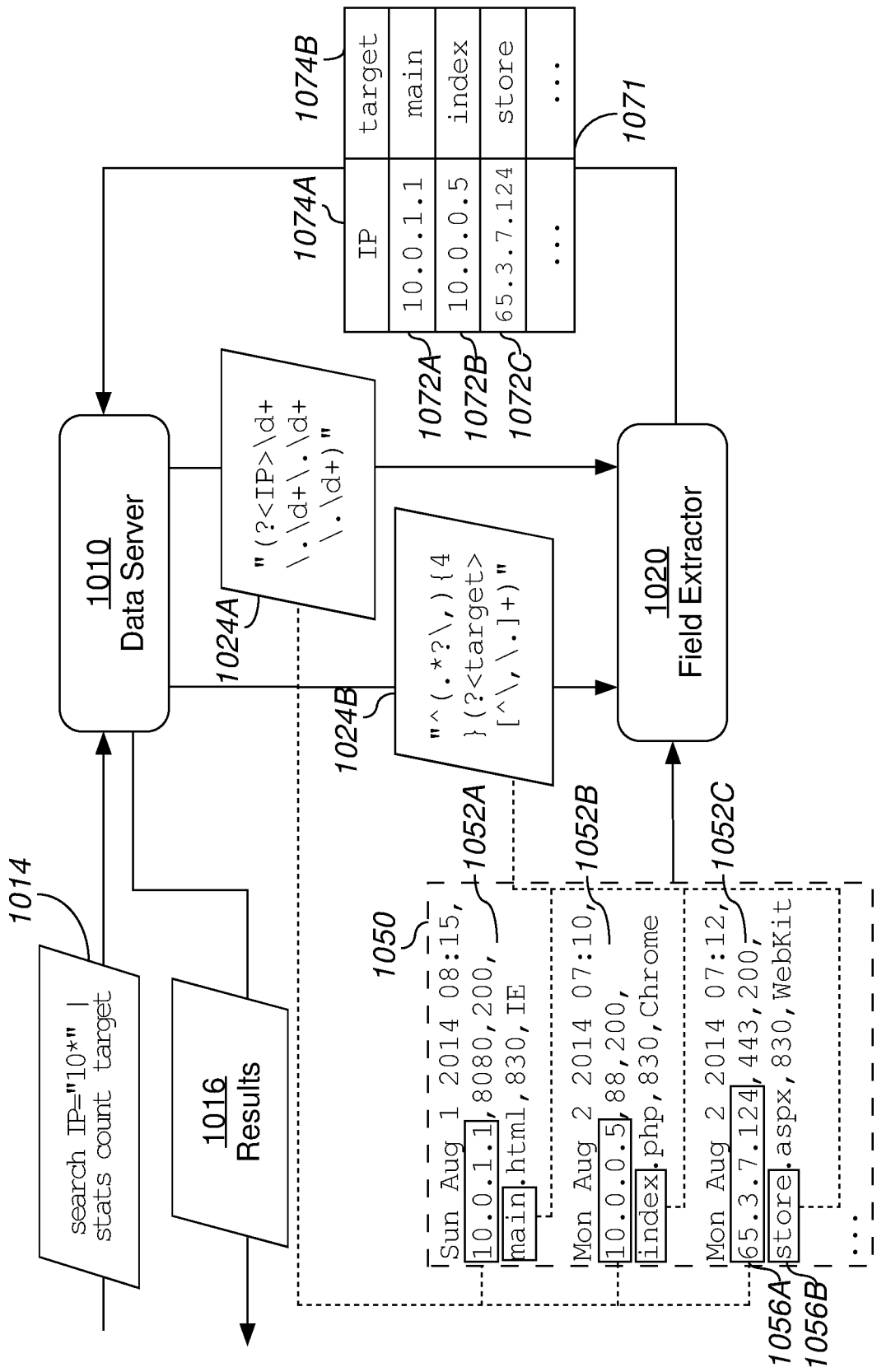
FIG. 10 is a block diagram that illustrates a subsystem comprising components configured to execute search requests, or portions thereof, that reference fields defined using extraction rules, according to an embodiment of the invention.

FIG. 10 is a block diagram that illustrates a subsystem 1000 comprising components configured to execute search requests, or portions thereof, that reference fields defined using extraction rules, according to an embodiment. Subsystem 1000 may be, for instance, a set of components within data intake and query system 100, or within any other data server system. Subsystem 1000 comprises a data server 1010, implemented by a set of one or more processes, executed by processors or other suitable components on one or more server computing devices. Data server 1010 is configured to perform data operations, such as executing search queries, with respect to sets of data items 1052 in a data repository 1050. For instance, data server 1010 may be one or more of indexers 102 and/or a search head 104, data items 1052 may be events and/or lines of raw data, and data repository 1050 may be one or more of data stores 103. While only data items 1052A-1052C are depicted, it will be appreciated that data repository 1050 may in fact store a large number of additional data items 1052, potentially having a variety of different underlying formats and structures.

Data server 1010 may perform data operations for a variety of reasons, including in response to one or more requests 1014 received by the data server 1010. A request 1014 may take any suitable form, depending on the embodiment. For instance, a request 1014 may take the form of a statement in a query language such as Search Processing Language ("SPL") in the example SPLUNK ENTERPRISE system, Structured Query Language ("SQL"), or any other suitable query language. As another example, a request 1014 may be formatted as Hyper-Text Protocol ("HTTP") GET requests or POST requests. The request 1014 may be a full query, or a portion of a query that has been delegated to the data server 1010 by, for example, search head 104.

In at least some instances, data server 1010 will execute data operations that reference named fields in data items 1052. For instance, as depicted, query 1014 references fields named "IP" and "target." Thus, in order to execute query 1014, data server 1010 needs to know what the values of these fields are for some or all of the data items 1052 in data repository 1050. However, the values for some or all of these named fields may not already be extracted for the data items 1052, and as a consequence data server 1010 may not be able to retrieve values for those fields using traditional database techniques. For example, the data server 1010 may be unable to directly locate values for the fields in terms of addresses within a storage system, as may occur in a relational database system, or in terms of pre-defined semantic labels within the data items itself, as may occur in traditional XML-based systems. Instead, data server 1010 is configured to utilize a field extractor component 1020 to dynamically derive field values 1071 for those fields, as needed during query execution. Though depicted as logically separate from data server 1010, field extractor 1020 may be a subcomponent of data server 1010, or a distinct component of subsystem 1000, depending on the embodiment.

Field extractor 1020 derives values for a field based on applying an extraction rule 1024 associated with that field to some or all of the data items 1052. Each name of a field may be used to reference the extraction rule 1024 associated with the field, and this extraction rule encompasses the logic for locating, in a data item, a chunk of the data item (a value) that corresponds to the field for that data item. In an embodiment, a field extraction rule 1024 may specify the location of a value for a field in terms of instruction(s) for parsing and/or analyzing the actual contents of a data item for specified patterns. For example, a field extraction rule 1024 may include a pattern matching instruction, such as a regular expression or portion thereof, by which the location of a chunk of a data item 1052 that corresponds to the field may be identified, and the chunk may be extracted from the data item 1052. Moreover, a field extraction rule 1024 may specify patterns to search for using any suitable convention, and not just regular expressions.

In some embodiments, the chunk is the value of the field for the data item. In other embodiments, a field extraction rule 1024 may further include one or more instructions for deriving a value for the field from the located chunk based on applying a function, formula, or other specified operation to the located chunk. For instance, a transformation rule may truncate the located chunk, or convert the located chunk into a different form.

When executing a query 1014 that references a named field, the data server 1010 will send the corresponding extraction rule 1024 to field extractor 1020, or otherwise provide data to the field extractor 1020 that indicates a corresponding extraction rule 1024 to process. For instance, data server 1010 may indicate which field names are involved in query 1014 and request that field extractor 1020 locate the corresponding field extraction rules 1024A and 1024B for those fields. Depending on the embodiment, the data server 1010 instructs the field extractor 1020 to apply the field extraction rule to all data items 1052 in a repository 1050, or to only a subset of data items 1052 that has already been filtered based on other criteria in the query 1014. Moreover, a field may be defined only for certain subset of the events that have been stored in data stores 103, in which case the field extraction rules associated with the field may only be applied to such events during a search.

The data server 1010 (or field extractor 1020) may identify an extraction rule 1024 to apply using a variety of techniques. For instance, a collection of extraction rules may be stored in a knowledge base, which functions as a repository of metadata concerning the data items 1052. A mapping between field names and extraction rules may be stored, by which a suitable extraction rule 1024 may be located when the corresponding field name is mentioned in a query 1014. Or, a field extractor 1024 may automatically process all field extraction rules 1024 within a knowledge base that are associated with specific data items targeted by the query 1014. As another example, the query 1014 may itself specify an extraction rule 1024.

The effect of the example extraction rules 1024 is illustrated with respect to example data items 1052A-1052C of repository 1050. Chunks such as chunk 1056A are located through extraction rule 1024A, which as depicted instructs the field extractor 1020 to look for a pattern of one or more digits, followed by a period, followed again by one or more digits, followed by another period, followed again by one or more digits, followed by another period, and finally followed again by one or more digits. These chunks are extracted as values for field 1074A. Chunks such as chunk 1056B are located through extraction rule 1024B, which as depicted instructs the field extractor 1020 to skip past the first four commas in a data item 1052, and then extract all characters until a comma or period has been reached. These chunks are extracted as values for field 1074B. Note that values 1071 comprise three different sets 1072 of values, since a value was extracted for each of the fields 1074 for each of the three example data items 1052. While values 1071 are illustrated in a table for convenience, it should be noted that field extractor 1020 may output values 1071 in any suitable format or provide them to data server 1010 to use the values to compare with search criteria in request 1014 on-the-fly without ever storing the values in a table.

Data server 1010 may then utilize values 1071 to perform the data operation(s) requested in request 1014. Depending on the data operations requested, a response 1016 may not necessarily include all or even any of values 1071. For example, response 1016 may include some or all of values 1071, statistics calculated based on values 1071, a data set filtered based on values 1071, a report in which certain values 1071 are embedded, a visualization such as a graph or chart based on values 1071, and/or other elements. In an embodiment, results 1016 may be returned directly to a client, or to a search head or other component for further processing. In an embodiment, in addition to values 1071 or data derived therefrom, results 1016 may include or reference the actual data items 1052 from which the values 1071 were derived.

2.3. Example Template-Based Field Extraction System

Figure 11:
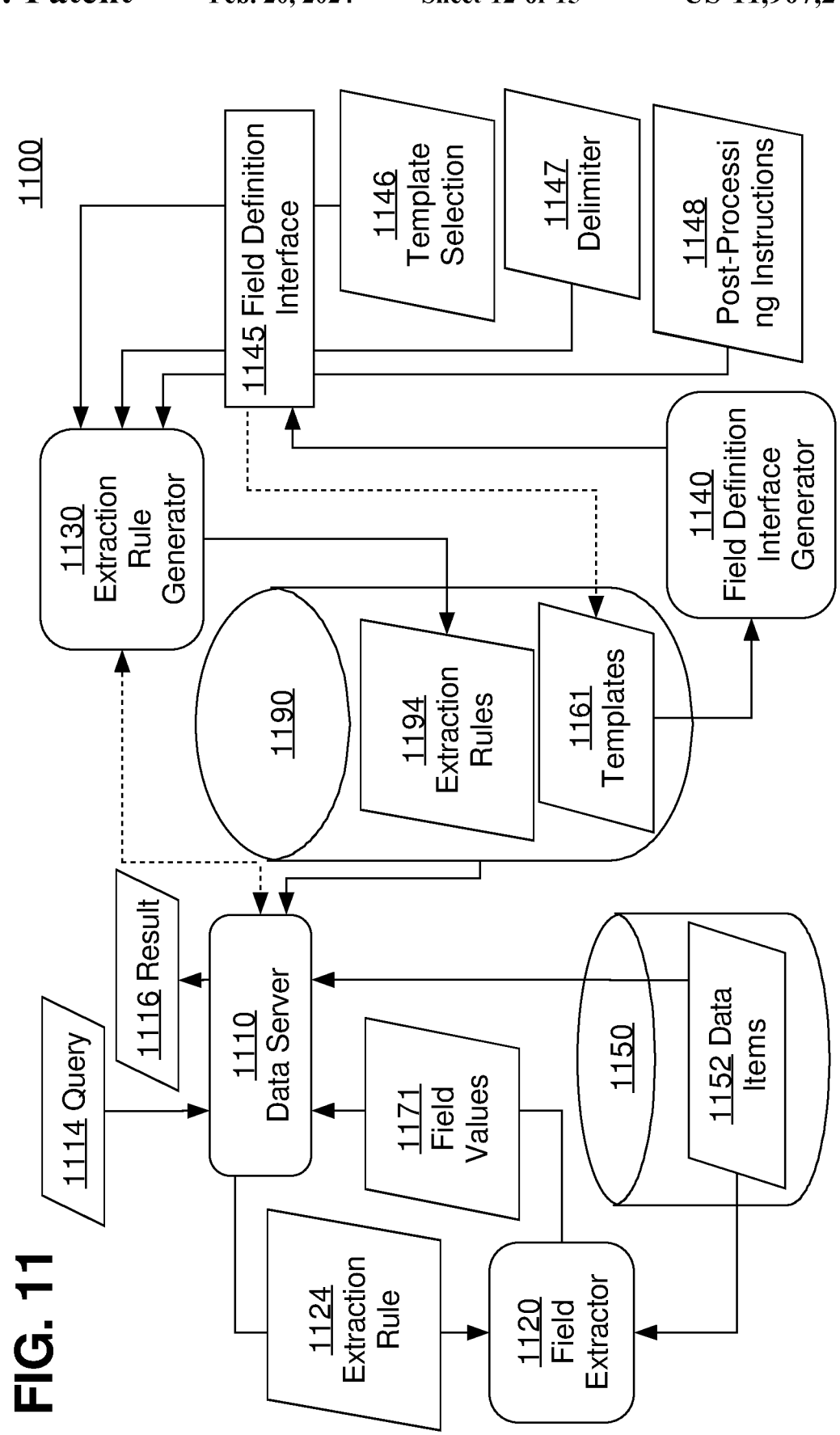
FIG. 11 is a block diagram that illustrates aspects of an example data server system in which the described techniques may be practiced, according to an embodiment of the invention.

FIG. 11 is a block diagram that illustrates aspects of an example data server system 1100 in which the described techniques may be practiced, according to an embodiment. Data server system 1100 may or may not be the same as system 100. The various components of system 1100 are implemented at least partially by hardware at one or more computing devices, such as one or more hardware processors executing instructions, stored in one or more computer-readable memories, for performing various functions described herein. In an embodiment, system 1100 is a server computer system, comprising one or more server computer devices that collectively implement the various components of system 1100 as a set of server-side processes. The server computer system may include, depending on the embodiment, application framework(s), web server(s), application server(s), and/or other conventional server components that the depicted components utilize to provide the described functionality.

System 1100 utilizes data repository 1150, implemented upon one or more storage devices. The data repository 1150, which may comprise features similar to repository 1050, comprises various data items 1152. The data items 1152 may take any of a variety of forms, depending on the data server system 1100. In an embodiment, each data item is an event data structure, as described in other sections. In another embodiment, each data item 1152 includes one or more lines of text in a file, comprising a plurality of data chunks separated by a comma, tab, space, or other suitable delimiter. In other embodiments, some or all of data items 1152 may be eXtended Markup Language ("XML") elements, individual files, or even rows of a relational database table. In yet other embodiments, data items 1152 may comprise data structures of any other suitable structure type. In an embodiment, there may be different collections of data items 1152 from potentially different data sources, with potentially different data formats.

Data server system 1100 comprises one or more data server components 1110. A data server 1110 may have features similar to, for example, those of data server 1010 of FIG. 10. A data server 1110 is configured to perform data operations, such as executing search queries 1114, with respect to sets of data items 1152 in repository 1150. Optionally, a different data server 1100 may be assigned to different sets of data items 1152. A query 1114 is an example of a search request 1014.

As a result of the performed operations, the data server 1110 may in some instances return result data 1116 that comprises data retrieved from the data items 1152 or derived based thereon. A result 1116 may be of any suitable structure, including without limitation the same structures in which the retrieved data is stored within the data items 1152, converted structures such as SQL result sets or XML documents, or derived structures such as web pages or images analyzing or visualizing the retrieved data.

Similar to data server 1010, a data server 1110 may be configured to utilize a field extractor 1120 to derive values for fields based applying an extraction rule 1124 associated with that field to some or all of the data items 1152. Likewise, extraction rules 1124 are similar to extraction rules 1024, and field extractor 1120 is similar to field extractor 1020.

In an embodiment, a collection of extraction rules 1194 may optionally be stored in a knowledge base 1190, which functions as a repository of schema and/or metadata concerning the data items 1152. Knowledge base 1190 may be stored within repository 1150, or separately from repository 1150. A mapping between field names and extraction rules 1194 may be stored, by which a suitable extraction rule 1124 may be located when the corresponding field name is mentioned in a query 1114.

Extraction rule generator 1130 generates extraction rules, including, in an embodiment, at least some of the extraction rules 1124. Depending on the embodiment, the generated extraction rules may be provided directly to a data server 1110, or stored as a collection of extraction rules 1194 in knowledge base 1190. Extraction rule generator 1130 generates extraction rules 1124 or 1194 in response to input that includes a template selection 1146, a delimiter identification 1147, and optionally one or more post-processing instructions 1148. In an embodiment, a collection of field extraction templates 1161 is stored in knowledge base 1190. The template selection input 1146 may reference one of these templates 1161, or may specify an entirely new template. Further explanation of the operation of the extraction rule generator 1130 is provided in other sections.

Inputs 1146-1148 may be received from any suitable component, including the data server 1110. However, as depicted, the input is received via a field definition interface 1145. Field definition interface 1145 is a graphical or command line user interface that accepts one or more of inputs 1146-1148, depending on the embodiment. A field definition interface generator 1140 generates the field definition interface 1145. In an embodiment, field definition interface 1145 includes a graphical input control that lists any stored templates 1161, and receives template selection input 1146 selecting one of the templates 1161. In an embodiment, field definition interface 1145 includes a graphical input control that lists common delimiters, and receives delimiter selection input 1147 that selects from these common delimiters and/or defines a unlisted delimiter. In an embodiment, some templates 1161 may specify a delimiter, and thus template selection input 1146 is the same as delimiter selection input 1147.

In an embodiment, field definition interface 1145 includes further controls for receiving ordering input that modifies ordering data within a selected template 1161 to associate a field name in the selected template with a different index position, as explained in other sections. In an embodiment, field definition interface 1145 includes control(s) for defining post-processing instructions 1148 to associated with certain field names in a selected template 1161. In an embodiment, field definition interface 1145 includes further controls for receiving input that adds or removes field names in a selected template 1161, or that requests to save a new template 1161 based on changes to field names and/or ordering data. In an embodiment, field definition interface 1145 includes a control that instructs extraction rule generator 1130 to generate an extraction rule 1194 based on various selected parameters within the field definition interface 1145, and store the extraction rule 1194 in knowledge base 1190.

Various examples of field definition interface 1145 are described in other sections.

System 1100 illustrates only one of many possible arrangements of components configured to provide the functionality described herein. Other arrangements may include fewer, additional, or different components, and the division of work between the components may vary depending on the arrangement. For example, in an embodiment, field definition interface 1145 may be optional. As another example, knowledge base 1190 may be optional.

2.4. Example Field Extraction Generation Subsytem

Figure 12:
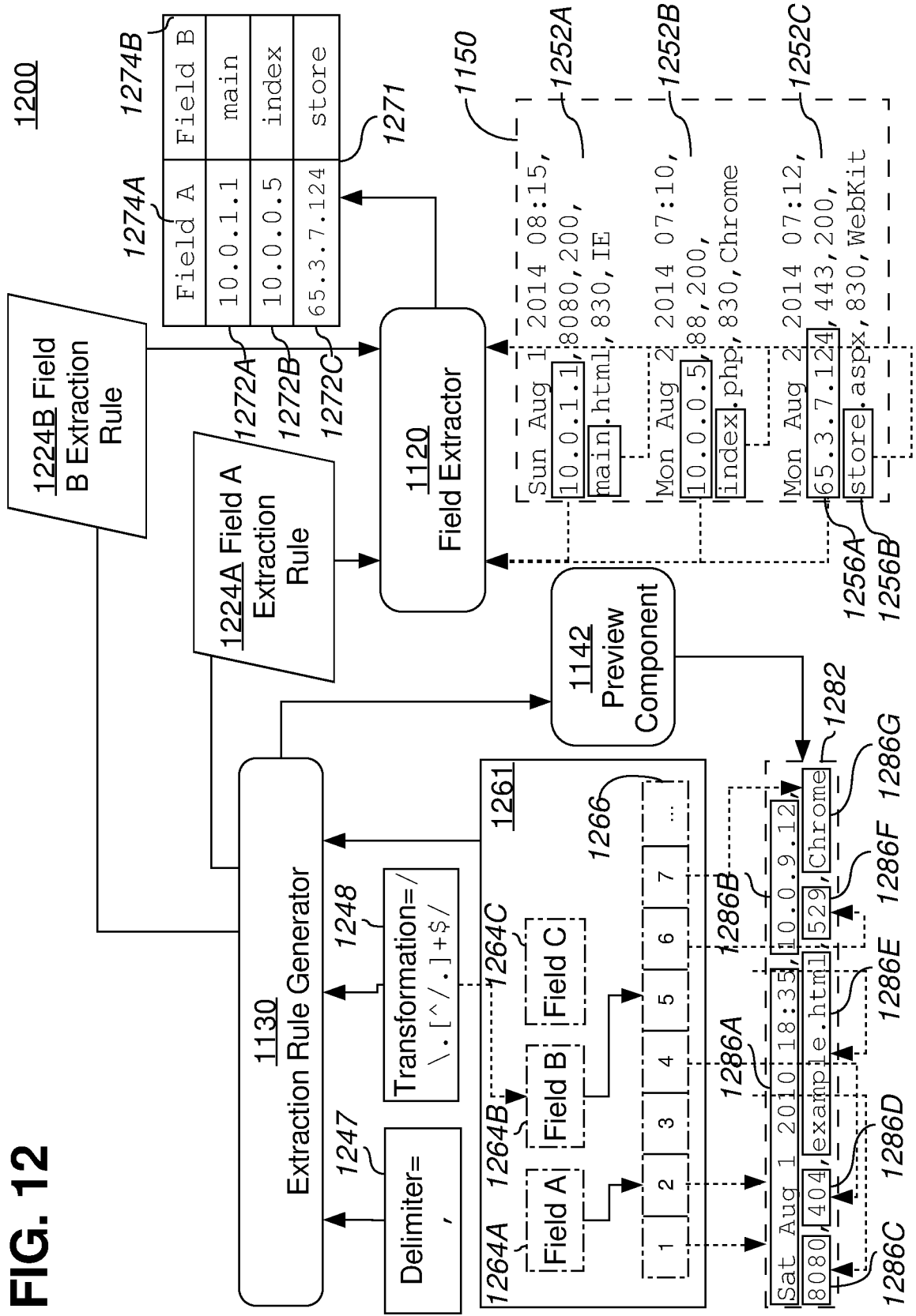
FIG. 12 is a block diagram illustrating interactions between various system components that are involved in generating and applying field extraction rules, according to an embodiment of the invention.

FIG. 12 is a block diagram 1200 illustrating interactions between various components of system 1100 that are involved in generating and applying field extraction rules, according to an embodiment. A field extraction template 1261 comprises a set of field names 1264A-C. The field extraction template 1261 further comprises ordering data 1266 that associates at least some of the field names 1264 in the set with different index positions. For example, as depicted, ordering data 1266 associates field name 1264A with a second index position, and field 1264B with a fifth field position. Ordering data 1266 may take a variety of forms, including an array, numbering following a field name 1264 in a list, and so forth. In an embodiment, ordering data 1266 may be implicit from the order of the field names 1264 in the template. Although only a limited number of available index positions are depicted in FIG. 12, there may in fact be any number of index positions available for assignment in ordering data 1266, depending on the embodiment.

In an embodiment, the ordering data 1266 need not necessarily associate every field name 1264 in the template 1261 with an index position. For example, as depicted, no index position is associated with field name 1264C. Including a field name 1264 in a template 1266, even when that field name 1264 is not associated with an index position, may be useful, for example, in embodiments where a field definition interface, such as field definition interface 1146, allows for ordering data 1266 to be modified prior to generating an extraction rule 1194. For instance, a user may quickly create an association between an index position and field name 1264C, without having to create the field name 1264C.

Template 1261 is one of several inputs to extraction rule generator 1130. For example, a user or a data server 1110 may have specified template 1261 as input to extraction rule generator 1130. Another input that may be specified is delimiter 1247. Delimiter 1247 may be any character or combination of characters. Examples of common delimiters 1247 include commas, colons, semi-colons, tabs, pipe symbols, and spaces. In an embodiment, delimiter 1247 may instead be a pattern, regular expression, formula, or logic that indicates a transition from one field to the next field. Delimiter 1247 may be specified separately from template 1261, or template 1261 may specify delimiter 1247.

In yet other embodiments, a component of system 1100 may predict a default delimiter 1247 from an analysis of one or more data items to which an extraction rule is intended to apply. For instance, if certain types of characters are repeated in multiple data items with a frequency that is greater than would normally be expected, such as pipe symbols or commas, the frequently repeated character may be guessed to be the delimiter 1247. Or, as another example, various pattern recognition or machine learning algorithms may be implemented that guess a delimiter 1247 based on the locations of certain common types of values (e.g. timestamps, IP addresses, and so forth) within the data items.

Delimiter 1247 is, in essence, an instruction as to how a data item should be divided into segments referred to herein as "chunks." For example, sample data item 1282 is a line of comma-separated values. The depicted delimiter 1247, which is a comma, instructs extraction rule generator 1130 to divide the data item 1282 into chunks 1286A-G, such that each chunk 1286 is bounded on at least one side by a comma. The chunks 1286 are arranged as an ordered set, or array, in which each chunk 1286 takes an index position that corresponds to its order within the data item 1282. For instance, in FIG. 12, chunk 1286A is assigned an index position of 1, chunk 1286B is assigned to an index position of 2, and so forth.

As depicted, the index positions of the chunks 1286 correspond to the index positions in the ordering data 1266. Thus, when the depicted delimiter 1247 is coupled with the index positions specified by ordering data 1266, data chunks that correspond to some or all of the fields 1264 may be located within the data items 1152 of repository 1150. For instance, field 1264A was assigned to the second index position by ordering data 1266, and consequently corresponds to data chunk 1286B. Meanwhile, field 1264B was assigned to the fifth index position by ordering data 1266, and consequently corresponds to data chunk 1286E.

The extraction rule generator 1130 is thus configured to utilize the specified delimiter 1247, the field names 1264, and the index positions that the ordering data 1266 associated with the field names 1264 to create one or more field extraction rules 1224. Field extraction rules 1224 instruct the field extractor 1120 as to how chunks that belong to the corresponding fields 1274A and 1274B should be located in data items 1152, and thus derive values 1271. For instance, a field extraction rule 1224A for field 1274A (having field name 1264A) may comprise an instruction to divide each data item 1152 into chunks using a comma, and then extract the second chunk as the value of the data item field 1274A. As another example, a field extraction rule 1224B for field 1274B (having field name 1264B) may comprise an instruction to divide each data item 1152 into chunks using a comma, and then extract the fifth chunk as the value of the data item for field 1274B.

In an embodiment, instead of requiring that each data item be divided into multiple chunks to locate the relevant chunk, a field extraction rule 1224 may be optimized to instruct the field extractor 1120 to locate the relevant chunk without actually dividing the data item. For instance, based on the index position for a field name 1264 and the delimiter 1247, extraction rule generator 1130 may generate a field extraction rule 1224 that is a regular expression that directly locates the relevant chunk.

In an embodiment, field extraction rules 1224 for all of the defined fields may be defined in the form of a string or other suitable structure that pairs the specified delimiter 1247 with a sequence of field names. The sequence may include "blank" field names that correspond to chunks that are not associated with field names 1264. The sequence may furthermore omit any trailing "blank" field names. For instance, in an embodiment, the field extraction rules 1224 are defined by the single string: "Fx:2_C: unused:Field A:_unused:_ unused:Tx(Field B)", where "2C" is a hexadecimal encoding of the delimiter, and Tx represents the defined post-processing rule.

Field extraction rule generator 1130 may further be configured to accept, as input, one or more post-processing instructions 1248. Each specified post-processing instruction 1248 is associated with a different field name 1264. Depending on the embodiment, post-processing instructions 1248 may be specified by a user, data server 1110, or the template 1261. In an embodiment, a post-processing instruction 1248 is added to the extraction rule 1224 for the associated field name 1264, such that an operation specified by the post-processing rule 1248 is performed on extracted chunks 1256 to derive a value 1271. For instance, the depicted post-processing instruction 1248 is associated with field name 1264B, and specifies a regular expression operation that truncates the last portion of chunks 1286E and 1256B. In some embodiments, certain post-processing instruction may be incorporated into the instruction to locate the chunk in the first place, rather than being performed subsequent to locating a chunk.

The effect of the example extraction rules 1224 is illustrated with respect to example data items 1252A-1252C of repository 1150. Chunks such as chunk 1256A are located through extraction rule 1224A. These chunks are extracted as values for field 1274A. Chunks such as chunk 1256b are located through extraction rule 1224B. These chunks are extracted as values for field 1274B. Note that values 1271 comprise three different sets 1272 of values, since a value was extracted for each of the fields 1274 for each of the three example data items 1252. While field extractor 1120 is illustrated as extracting values 1271 for all of the field names 1264 in the template 1261 for which an extraction rule 1224 was generated. However, in other instances, field extractor 1120 may extract only some or even none of fields 1274, depending on which fields 1274 are referenced in a query.

Sample data item 1282 is shown in FIG. 12 primarily for illustrative purposes. However, in an embodiment, system 1100 may also include an optional preview component 1142 that displays sample data item 1282 to a user in field definition interface 1245, divided into chunks 1286 for the purpose of illustrating to the user the effect of a delimiter 1247 on one or more sample data items. In an embodiment, the sample data item 1282 may be selected by a user, or selected from a set of data items selected by a user. In some embodiments, selection of a set of data items may cause the template 1261 and/or extraction rules 1224 to be associated only with that set of data items. However, this need not necessarily be true of all embodiments.

In an embodiment, the preview component 1142 may further show an indication of which field names 1264 are mapped by the ordering data 1266 to which sample chunks 1286, along with controls for changing the mapping. The preview component 1142 may optionally illustrate the effects of post-processing rules 1248 on the sample chunks 1286.

The components and data structures shown in FIG. 12 are only examples of components and data structures that may be utilized in practicing the described techniques. In other embodiments, there may be additional or fewer elements, in potentially varying arrangements. Moreover, the division of work between components may vary from embodiment to embodiment.

In an embodiment, with respect to the field extraction rules generated through the described techniques, a single field is the set of all chunks at a specific position, across all events that that a user defined delimiter and associated template have been applied to. A field, in abstract, may be considered a rule for how one finds, in any given data item for which the field is defined, a particular sub-element of the data item, and the value for that field is the sub-element.

3.0. Functional Overview

The techniques described in this disclosure are performed by a system of one or more computing devices, such as data server system 1100 depicted in FIG. 11 or other data server systems. In an embodiment, each of the processes described in connection with the functional blocks described herein may be implemented using one or more computer programs, other software elements, and/or digital logic in any of a general-purpose computer or a special-purpose computer, while performing data retrieval, transformation, and storage operations that involve interacting with and transforming the physical state of memory of the computer.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 13:
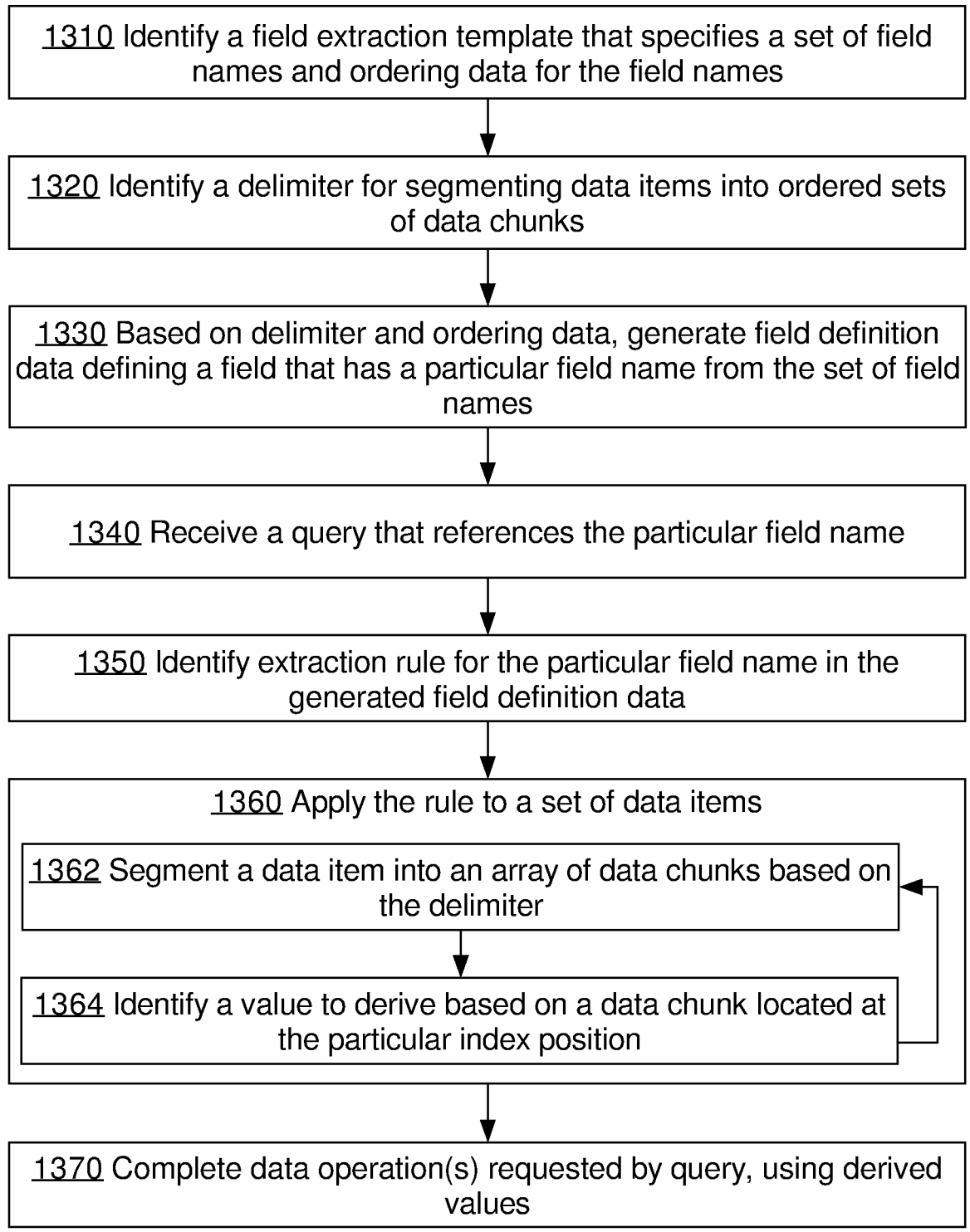
FIG. 13 illustrates a general flow for generating and applying field extraction rules, according to an embodiment of the invention.

FIG. 13 illustrates a general flow 1300 for generating and applying field extraction rules, according to an embodiment.

Block 1310 comprises identifying a field extraction template, such as field extraction template 1261, to apply to data items in a data repository, such as data items 1152 in repository 1150. As described in other sections, the field extraction template may comprise ordering data for a set of field names. The ordering data may associate the field names with different index positions.

In an embodiment, identifying the field extraction template comprises receiving, in a user interface such as field definition interface 1145, input that selects the field extraction template from a plurality of available templates. The plurality of available templates may include at least two templates with different sets of field names and different ordering data, adapted for different uses and/or types of data items. The user interface may include, for example, a pull-down control that lists each template and allows a user to select one of the templates. Optionally, the user interface may allow a user to preview aspects of the different templates, modify templates, and/or save new templates.

In an embodiment, identifying the field extraction template is performed based on instructions in the query. For example, the query may specify a name of a saved template from a collection of templates, such as collection 1161. In an embodiment, the query need not explicitly specify the name of the template. Rather, the identity of the saved template may be determined based on user-configurable mappings between saved templates and other aspects of the query, such as the data set targeted by the query or a field name referenced by a query.

Block 1320 comprises identifying a delimiter for segmenting the data items into ordered sets of data chunks. Depending on the embodiment, the delimiter may be a character, combination of characters, pattern, regular expression, or any other information by which boundaries between different data chunks within a data item may be determined.

In an embodiment, identifying the delimiter comprises receiving input, in a user interface, that defines the delimiter. For instance, the second input may select the delimiter from a pull-down control listing certain characters or groups of characters. In an embodiment, selection of a delimiter may cause the user interface to display a preview of an array of chunks derived by segmenting one or more sample data items based on the delimiter. The one or more sample data items may be selected using techniques such as described in other sections.

In an embodiment, identifying the delimiter may instead comprise identifying a default or fixed delimiter defined in the template identified in block 1310. In an embodiment, identifying the delimiter may be performed based on instructions in a query.

In yet other embodiments, identifying the delimiter may comprise receiving a selection or specification of a set of data items with which the identified template is to be associated, and selecting a delimiter predicted to best fit the data set. For instance, various common delimiters and/or frequently repeated characters in the data items may be tested against a selection of the data items. The delimiters may be scored based on the arrays of data chunks they produce. For instance, a delimiter may be scored highly if it consistently produces a certain number of data chunks, and/or chunks at certain index positions consistently show certain characteristics (e.g. being of the same length or data type). In an embodiment, some or all of the field names in a template may optionally be associated with certain types of data, and delimiters may be scored based on how consistently chunks at certain positions conform to data types that match those associated with the field names.

Block 1330 comprises generating field definition data defining a field that has a particular field name from the set of field names in the identified template. The field definition data comprises a field extraction rule for deriving values for the field from the data items. The rule is based at least on the identified delimiter and a particular index position associated with the field name in the ordering data. The rule indicates how to locate a particular chunk of a given data item that corresponds to the field. The particular chunk is such that, if a given data item were split into an array of chunks using the identified delimiter, the particular chunk would be at the particular index position within the array. The rule may take any suitable form, so long as it indicates how to locate the particular chunk, regardless of whether the rule actually involves creating an in-memory array of chunks. For instance, in an embodiment, the rule may be to skip past (n−1) instances of the delimiter, where n is equal to the particular index position, and then extract all text from that point until the nth instance of the delimiter.

In an embodiment, block 1330 is performed responsive to input, in a user interface, that identifies the template and the delimiter. For instance, upon selecting a template and a delimiter, the field definition data may automatically be created, along with field definition data for any other field names that are associated with index positions within the template. In another embodiment, upon selecting a template, a user is provided with a control to request creation of field definition data for some or all of the field names. The user interface may optionally allow a user to preview the effects of the extraction rules that will be generated on sample data, manipulate field names and/or ordering data, define post-processing instructions, and/or make other various modifications before requesting creation of extraction rule(s). Optionally, any modifications made through the interface may be saved for use in future templates. In an embodiment, once generated, the field definition data for the particular field name, and any other field names that may have been associated with index positions, is then saved in a repository such as knowledge base 1190.

In an embodiment, block 1330 is performed responsive to a query that identifies the template and/or delimiter. For instance, a data server may identify a template and delimiter based on a query, and request that, based at least on the template and delimiter, a field extraction rule generator generate field extraction rules for field names referenced by the query.

Block 1340 comprises receiving a query that references the particular field name. In embodiments where the field definition data of block 1330 is created via a user interface, block 1340 may occur at any time after storage of the field definition data. However, as stated above, in certain other embodiments, the query actually triggers performance of blocks 1310-1330. The query may be any type of query. Although in certain embodiments, the query may specifically request the values for the particular field name, in other embodiments the query may request that data operations be performed with respect to the values, such as performing calculations based on the values and/or generating a report. In an embodiment, the reference may be an implicit reference. For instance, the query may specify that operations be performed with respect to a data construct that, in turn, references the particular field name.

Block 1350 comprises identifying the rule, as generated in block 1330, so as to derive values for the field. For instance, in an embodiment, when a query is subsequently received that references a named field, a data server will look for the named field in a repository, and locate the field extraction rule for the named field if the named field exists.

In an embodiment, a query may identify a template and, if not defined by the template, a delimiter. Block 1350 may thus comprise requesting that a field extraction generator perform block 1330. For instance, a knowledge base may save an association between a template, delimiter (if not defined in the template), and a set of data. When a query is received that references a named field, a data server will attempt to locate the field name in any templates associated with the data. When a template that lists the field name is found, the data server generates a temporary field extraction rule based on the template for the purpose of extracting values for the named field during the query.

Block 1360 comprises applying the rule to a set of data items. The set of data items may be all data items in a repository, or the set of data items may be limited to a set of data items specified by criteria in the query. Block 1360 more specifically comprises performing sub-blocks 1362-1364 for each data item in the set of data items.

Block 1362 comprises segmenting the data item into an array of data chunks based on the delimiter. The array may be, but is not necessarily, an actual data structure. Rather, the array may be a logical ordering of the chunks within the data item, as defined by the identified delimiter. The segmentation process of block 1362 may simply involve, at some level, identifying the chunks. The order in which the chunks appear within the data item inherently forms the array. For instance, the segmentation may involve iteratively skipping through each chunk of the data item to reach the next instance of the delimiter, as the data item is being parsed with a regular expression. Some or even many of these chunks will simply be discarded rather than stored in any structure; however the chunks are still, for the purposes of this disclosure, said to form an array.

Block 1364 comprises identifying a value to derive based on a data chunk located at the particular index position. Depending on the extraction rule, the value may be the same as the chunk, or the value may be derived based on applying post-processing instructions to the chunk. For instance, the chunk may be truncated or converted to another format. Or, the chunk may be passed as input to a specified formula or function, which then returns the value for the field. The post-processing instructions could be incorporated into the extraction rule that is generated based on a index position relative to a specified delimeter.

Block 1370 comprises completing the data operation requested by the query, using the values derived for the set of data items.

Flow 1300 illustrates only one example of a method for generating and applying field extraction rules. Other flows may feature fewer or additional elements, in potentially varying orders. For example, in embodiments, blocks 1350 and 1360 are repeated for each of a plurality of field names referenced by the query. Thus, flow 1300 may involve determining how to derive data for each field in a plurality of fields based on field definition data generated using a field extraction template. As another example, in embodiments, the extraction rule may further be generated based on one or more post-processing instructions that are associated with the particular field name. The one or more post-processing instructions may be specified in the template, or specified by a user via controls within a user interface.

Various examples of post-processing instructions are described in other sections of this disclosure. In an embodiment, another use of a post-processing instruction may be to derive multiple fields from the same data chunk. For instance, one comma-delimited chunk of a data item may contain both a date and a time. Separate "date" and "time" fields may be derived from this chunk by truncating the chunk and/or applying a formula to the chunk to differentiate between the date value and the time value.

In an embodiment, a field definition interface may include a preview that comprises, in addition to a segmented sample data item, field name indicators indicating one or more of the field names, from the identified template, that would be associated with one or more of the sample chunks, based on the ordering data. One or more controls may be displayed for rearranging field name indicators to be associated with different sample chunks, thereby modifying the ordering data. For instance, via the control(s), a user may associate a second field name of the identified template with a sample chunk at a new index position. The field definition data may thus include a second rule for deriving values for a second field of the second field name, based on the identified delimiter and the new index position.

In an embodiment, a template may further include a second set of field names for which the ordering data in the template does not indicate index positions. A field definition interface may allow the user to assign a second field name in the second set of field names to a second index position, and field definition data for the second field name may be generated based thereon.

In an embodiment, a query may specify a template and, if not defined by the template, a delimiter. Values are extracted for fields referenced by the query based on field extraction rules dynamically generated from the template and the delimiter. Hence, for instance, different fields may be defined for the same data, depending on which template a query specifies.

4.0. Field Definition Interfaces

In an embodiment, a data server system such as data server system 1100 may provide an interface, such as field definition interface 1145, for defining fields and field extraction rules using templates. Example aspects of one such interface are now described. However, the interface is described for illustrative purposes only. In other embodiments, a variety of other interfaces may be provided for defining fields and field extraction rules using templates, comprising additional or fewer elements, in varying arrangements.

A user may use an interface provided by a data server system to select one or more data sources and, optionally, view representative data items from the selected data source(s). The user may then apply a template to define fields for the selected data source(s). In another configuration, the interface may render field definition samples that the user may select and apply to one or more of the chunks of a sample data item, thereby associating various field names with various index positions. The interface might also provide functionality that allows a user to define and apply a delimiter to separate the data into its constituent chunks. The definitions may then be used to derive values from the data items for the defined fields.

Some configurations of the presently disclosed subject matter provide a user interface configured to receive an input from a user to modify the ordering data within the template. A user may be provided with a graphical user interface configured to receive a "drag and drop" input of a field name indicator onto representative chunks from a sample data item from a selected data source. As used herein, a "drag and drop" input comprises the selection of a field name indicator and graphical movement of the selected indicator onto the corresponding chunk. The user interface may also be configured to allow a user to generate a unique field name or utilize pre-defined field names provided by the data server system as field labels. The set of field names corresponding to the displayed field name indicators, along with the ordering data derived from the arrangement of those field name indicators relative to the sample data chunks, form a template. The template may optionally be saved for future use.

In an embodiment, the interface may allow the user to request that one or more extraction rules be generated and saved based on the selected template and the selected delimiter. The generated extraction rules may be specific to the specified data source, or may apply to all data items within a repository. In another embodiment, the interface may allow the user to save an association between a specified template, delimiter, and, optionally, the specified data source, so that extraction rules may be generated dynamically based on the template as needed.

The one or more fields defined by a template may be made available as part of the schema for searches on all events coming from the source(s) for which the template was created. For example, a template may be chosen or created, and then saved for data items (e.g., events) derived from data of a particular source. A template may have a field definition that, for example, the fifth subset of data (e.g., chunk) from the beginning of the data item, when the data item is divided by the specified delimiter (e.g., ","), has a field name of "customerID." In subsequent searches on any data item derived from data of that source, the fifth subset of data from each event will be searchable under the field name "customerID."

In other words, a set of field definitions may be derived from a template that is to be applied to a particular data source. One of the field definitions of the set of field definitions may identify that the first subset of data (e.g., the subset of data having the first ordinal position in the series of subsets of data of an event) in all data items from a particular data source has a field name "IP address." Another field definition of the set of field definitions derived from the same template may identify that the second subset of data (e.g., the subset of data having the second ordinal position in the series of subsets of data of the event) in all data items from the particular data source has a field name "SC-BYTES." When a subsequent search is to be performed on any data items from that particular data source, the search may reference the "IP address" and/or "SC-BYTE" field names to extract these subsets from the data items.

In some configurations, a template may be a pre-defined set of fields a user can apply to a data source. A user can apply a pre-existing template, or save a current configuration as a template for future use. Templates may be classified according to their signature, which is an arrangement of the field names defined by the template relative to the index positions with which the field names are associated. In some configurations, a color code may be applied to each unique signature to allow a user to recognize equivalent configurations. For example, a user, when utilizing various aspects of the subject matter described herein, may inadvertently create a data mapping that matches a pre-existing template. A user interface may recognize the currently applied mapping as a pre-existing template and respond by changing state. For example, a template drop-down may change color. The color may be reserved for a particular template. In some configurations, this behavior may act as a mnemonic device, and serves to allow not only comparisons between data sources, but also as an indicator that the current mapping matches a previously used mapping.

4.1. Illustrative Interface

Figure 2:
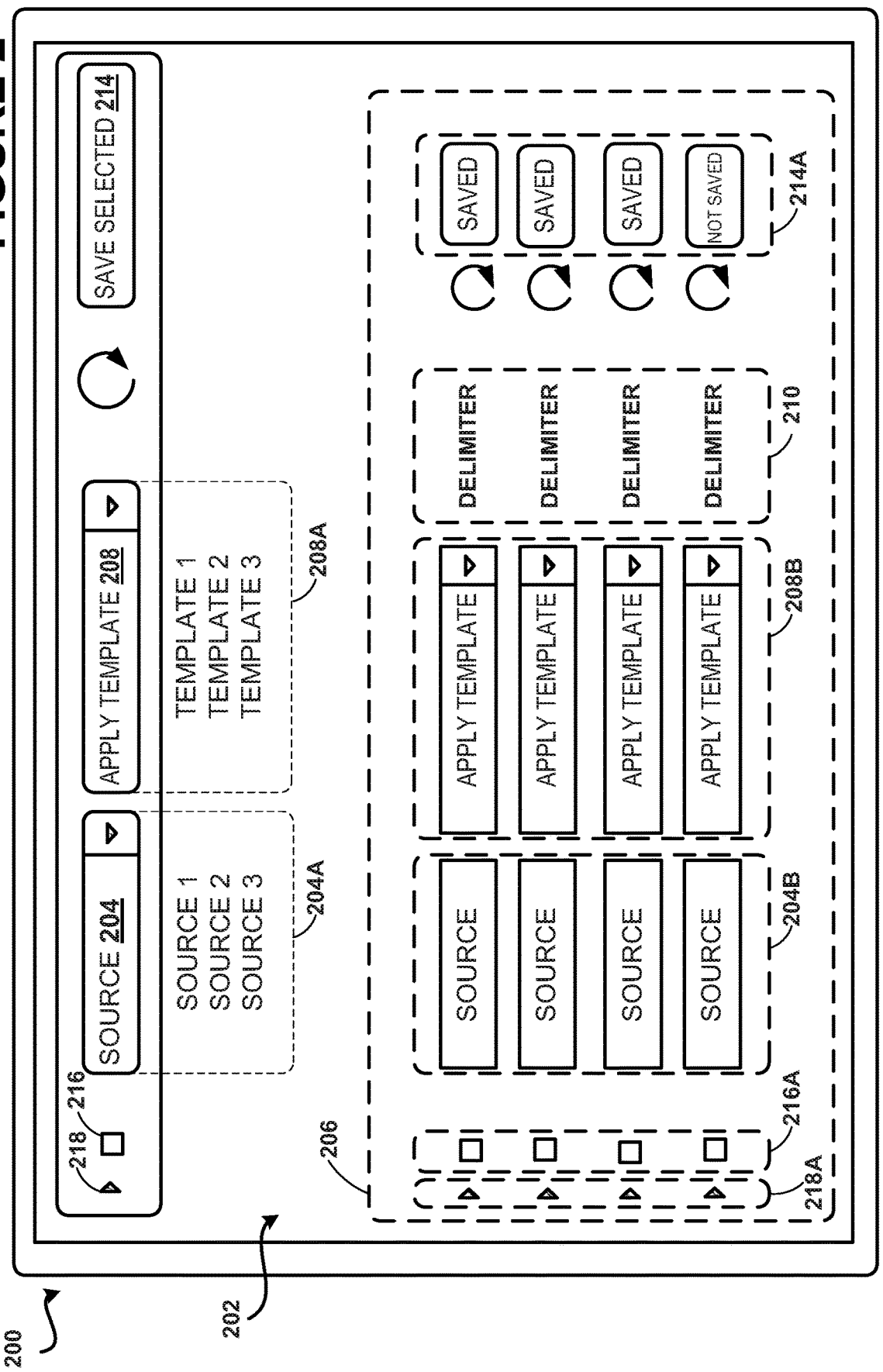
FIG. 2 is an interface diagram showing an illustrative display of an interface disclosed herein that may be used to define fields, in accordance with some embodiments.

FIG. 2 is an illustrative display 200 of a field definition interface 202, according to an embodiment. The field definition interface 202 may be used to define fields in data. The field definition interface 202 may include various user interface controls configured to receive inputs. The field definition interface 202 may include a source input control 204. It should be understood that the source input control 204, as well as other components of the field definition interface 202, may be delineated using a dashed line. Dashed lines, which may or may not be rendered in the display 200, are used in the following description as a matter of convenience for purposes of describing the presently disclosed subject matter. In addition, the use of these and other dashed lines herein is not meant to connote a functional boundary.

The source input control 204 may be configured to receive an input of a selection of a source for a set of data items. Depending on the embodiment, a source may identify a set of data items using any sort of criteria, including the name of a hostname, device, or file from which the set of data items was received, a type of source from which the set of data items was received, a search query that returns the set of data items, a regular expression that matches any of the foregoing, and so forth. The source input control 204 may be configured to provide a source input control dropdown list 204A when selected. The source input control dropdown list 204A may render the identification of one or more data sets known or previously used in conjunction with the source input control 204. For example, the source input control dropdown list 204A has rendered SOURCE 1, SOURCE 2, and SOURCE 3. Input selecting a particular source may be provided by a selection of one of the sources in the source input control dropdown list 204A. Alternatively, a name or query corresponding to the source may be specified manually through text entry within source input control 204.

Upon the receipt of a selection of a data source, template working area 206 is updated to include controls for defining fields for use with the selected data source. In an embodiment, template working area 206 comprises a separate row for each data source selected via source control 204 in a given user session. In each row, a local source input control 204B indicates the source associated with the line. In an embodiment, the local source input control 204B may be similarly configured as the source input control 204, thus allowing a user to modify the set of data items associated with a given row.

The field definition interface 202 may also include a template selection control 208. The template selection control 208 may be configured to receive an input of a selection of a predefined template to apply to all events derived from data, In an embodiment, template selection control 208 may be configured to receive an input to indicate the creation of a new template. In an embodiment, each predefined "template" may be a text file saved in a predefined repository or folder. In other embodiments, a template may be described by any suitable data structure, including database record(s), XML, element(s), binary representations, and so forth. The template selection control 208 may be configured to receive an input to apply a selected template to all selected data sources in template working area 206.

In an embodiment, the template selection control 208 may include a template selection control dropdown list 208A. The template selection control dropdown list 208A may include one or more predefined templates for selection. In one configuration, the templates rendered for selection within the template selection control dropdown list 208A may include previously used templates and/or templates selected for possible use depending on the source type or source of the data. For example, a user may select a specific web-log server as the source of the data. A template corresponding to the selected source may have been previously generated. When the selection of the particular source occurs, the source or source type of the data may be determined and one or more pre-configured templates may be presented based on the determination of the source or source type. In an embodiment, based on one or more analyses of the selected data set, as described in other sections, a template that best fits the data set may be suggested or chosen by default. If template selection control dropdown list 208A does not have a desired template, a new template option may be selected to indicate the desire to create a new template.

The template selection control dropdown list 208A may include templates based on other factors not described above. For example, the templates rendered for selection may be based on some additional context of the data. The context may be based on the data, such as the source, the name of the data, and the like, the user's role or function, or, by way of example, the domain of the desired output. The domain of the desired output may, by way of example and not by way of limitation, require certain security features or be used for a certain purpose such as financial analysis and performance metrics.

Figure 3:
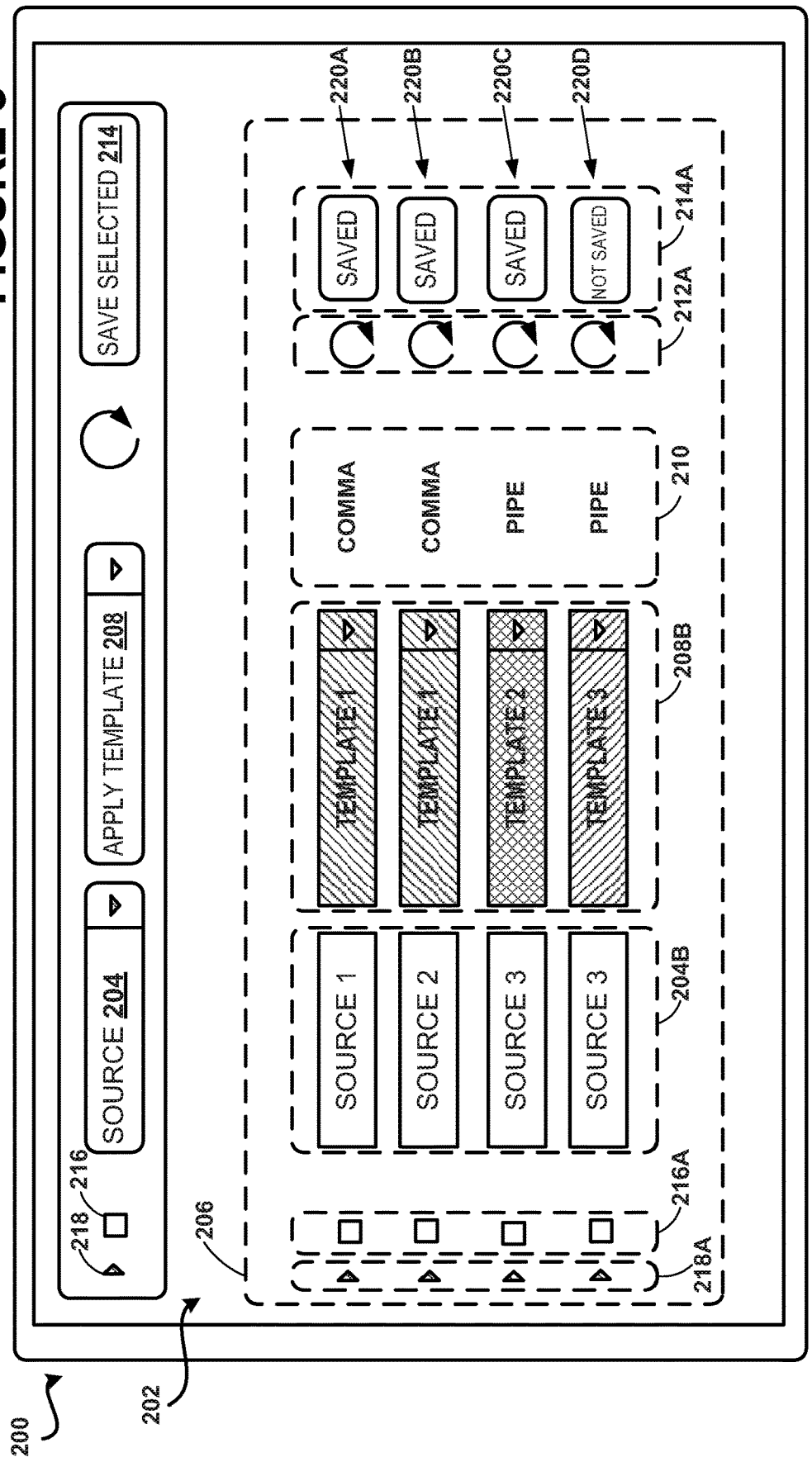
FIG. 3 is an interface diagram showing aspects of an interface in which various inputs have been received in a template working area, in accordance with some embodiments.

In some configurations, it may be desirable to apply different templates to different data sources in the template working area 206. In that configuration, a local template selection control 208B may be rendered in each row within the template working area 206. It should be understood that, in some embodiments, the presently disclosed subject matter does not require the use of a predefined template. For example, as illustrated in FIG. 3, below, a user or other entity may generate and apply original field definitions or may use pre-generated field definitions and apply the definitions to various chunks of a sample data item. Further, the presently disclosed subject matter is not limited to templates using editable fields.

In another example, a template may include one or more fields that have been identified with a "common information model" ("CIM") name. A common information model is a standardized set of field definitions across different sources. For example, an industry standard may be utilized to format the contents of web server logs. The industry standard may require that all web server logs that meet this particular standard use the same data format. In this manner, a template based on a common information model can be applied to more than one source if the sources are known to comply with the standard. In some configurations, a CIM may be used when two different subsets of data of events represented by two different field names are defined for two different data sources. A user may be able to identify the two different subsets of data of events with a common field name indicating that the fields relate to equivalent data from different sources. These and other examples of standardized behavior are considered to be within the scope of the present disclosure.

As discussed above, data items may be formatted differently depending on the source of the data and/or other factors. One common formatting difference is the delimiter used to separate different sub-elements of a data item. Accordingly, each association between a template and data source in template working area 206 may further include a delimiter control 210 designating the type of delimiter used for a selected data source and template. In an embodiment, the delimiter is predefined for the template and/or selected based on an analysis of the associated data set, as described in other sections. In an embodiment, a user may select a delimiter for via delimiter control 210. For example, a pull-down list may allow a user to select from common delimiters or delimiters that have been suggested based on the analysis of the associated set of data. A variety of other interface elements may instead exist for selecting a delimiter.

The field definition interface 202 may also include various features to facilitate a user's interaction with the field definition interface 202. For example, the field definition interface 202 may include a global save control 214 that is configured to receive an input to save field definition data derived from currently selected parameters in the template working area 206. Specifically, template working area 206 includes a selection control 216A for each depicted row, which allows a user to select or unselect the associated row. A global selection control 216 enables a user to select or unselect all selection controls 216A at once. In an embodiment, when global save control 214 is selected, field definition data is saved for each selected row, as indicated by the selection controls 216A. The field definition data saved for a given row includes one or more field extraction rules that are generated based at least on the template indicated by template control 208B and the delimiter indicated by the associated delimiter control 210. The field definition data may, in some embodiments, be specifically associated with the source indicated in the associated source control 204B. Local save indicators 214A indicate whether the field definition data currently defined in each row has been saved. These indicators 214A may optionally be configured to allow a user to generate and save field definition data individually. In other embodiments, only an association between a template, delimiter, and, optionally, a data source, are saved, and field definition data may be generated from the association at another time (e.g., when a query is executed).

In some configurations, the field definition interface 202 may also include a global expander control 218, which may be used to expand information associated with all rows in the template working area 206, or local expander controls 218A, which may be used to expand information associated with individual rows in the template working area 206. In some embodiments, the field definition data may further be generated based on other parameters specified through controls exposed via local expander controls 218A or global expander control 218, as described subsequently.

FIG. 3 is an illustration showing the display 200 in which various inputs have been received in template working area 206. As illustrated, the template working area 206 contains rows 220A-220D. The rows 220 are rendered in response to an input received at either the source input control 204 or the source input control dropdown list 204A. As described above, each row is associated with a set of data, as indicated by source controls 204B. Rows 220 include a row 220A associated with SOURCE 1, row 220B associated with SOURCE 2, and rows 220C-220D associated with SOURCE 3. Although the presently disclosed subject matter is not limited as such, rows may be rendered multiple times for a single source for various reasons. For example, a user may want to test different templates on the same representative event data from the same source at the same time. In another example, the same set of data items may be used by different search clients, which may require different field definitions.

The display 200 also has rendered template selections made via template selection control(s) 208 or 208A. In FIG. 3, the template selections are TEMPLATE 1 for rows 220A and 220B, TEMPLATE 2 for row 220C, and TEMPLATE 3 for the row 220D. As described above, the same template may be used on more than one source and different templates may be applied for multiple instances of the same data source. For example, rows 220C and 220D are associated with the SOURCE 3. But, the row 220C has TEMPLATE 2 associated with it, while row 220D has the TEMPLATE 4 associated with it.

The template selected for a particular row 220 may be rendered using a term identifying the template, such as TEMPLATE 1, or some other form. In FIG. 3, the template selections are identified by the terms as well as a fill pattern. For example, TEMPLATE 1 is shown having a hatch-right pattern, TEMPLATE 2 is shown as having a cross-hatch pattern, and TEMPLATE 3 is shown as having a hatch-left pattern. Other manners of identifying the various template selections may be used. One example may be to use different colors to identify the different templates.

FIG. 4A is an illustration of the display 200 showing a field preview area 420, which forms a part of the template working area 206 when a specific row 220 is selected. In FIG. 4A, the row 220A has been selected for further operation using the local expander control 218A1. When the local expander control 218A1 is selected, the template working area 206 of FIG. 3 is expanded by rendering the field preview area 420, which presents details regarding the field definitions currently defined in row 220A.

The field preview area 420 includes sample data for row 220A. In the example illustrated, the sample data item may have been derived, for example, from a time-stamped event reading as follows: "115.234.212.124,R1,[24/MAY/2012: 07:56:13],200". This sample data item 422 has been broken into its constituent elements, or "chunks." These chunks, represented within the interface using chunk indicators 422, are "115.234.212.124," "R1," "[24/MAY/2012:07:56:13]," and "200". The sample data item may be a random event provided by the SOURCE 1, may be the first event data received from the SOURCE 1, or may be different event data depending on the particular configuration. Further, the sample data item does not need to be actual data, as the SOURCE 1 may be configured to transmit "dummy" data for purposes of defining the fields. As used herein, "dummy" data is a sample data item that is representative of data from the SOURCE 1 but is not an actual data item itself. The present disclosure is not limited to any particular method used to identify and retrieve the sample data item.

The field preview area 420 also includes, adjacent to each chunk indicator 422, a field name input controls 424. Via the field name input controls 424, a user may specify a field name to associate with the index position that corresponds to the adjacent chunk indicator. For example, the second depicted chunk indicator 422 depicts a sample value of "R1." A user may type in a field name in the field name input control 424 that is under the second depicted chunk indicator to associate the field name with the second index position, thereby defining a field definition having the entered field name. The field definition would include a rule to extract, from each data item in SOURCE 1, as the value for the newly defined field, the second chunk, as defined by the depicted delimiter 210A.

In an embodiment, the field preview area 420 may further include field name indicators 426. In an embodiment, some or all of the field names represented by the field name indicators 426 are defined with the template selected in row 220A. In an embodiment, some or all of the field names may be automatically generated based on the source, user identity, or previous user behavior. In an embodiment, field preview area 420 may include a control for defining a new field name, and a corresponding new field name indicator 426 may be added to field preview area 420. The field name indicators 426 may be used in conjunction with a delimiter 210A to establish a field definition for a new field, instead of or in addition to manually typing a field name. For example, one of the field name indicators 426 may be applied to one of the field name input controls 424. The particular label applied from the field label samples 426, the delimiter, and the particular field's placement in the representative event data may be saved as a definition of a particular field, as will be explained in more detail below.

To apply one of the field name indicators 426 to the field name input controls 424, to define a field, the particular field name indicators 426 may be moved to the field name input controls 424. In one example, a user 428 may select the CS-HOST field label 430 and move the CS-HOST field label 430 to the field input 424A of a field chunk 422A. The CS-HOST field label 430 may be moved using various input technologies, include keyboard, mouse, pen, and other selection and movement technologies. The CS-HOST field label 430 may also be "moved" through a text input in the field input 424A.

In an embodiment, a template may include default ordering data for a set of field names. Consequently, when a template is selected in a control 208B, field preview area 420 will be pre-populated with an arrangement of the field names relative to the sample chunks 422, such that certain field name indicators 424 will already be associated with certain field name input controls 424. A user may proceed with the arrangement of field names predefined by the template, or the user may define additional fields using techniques such as described above.

In an embodiment, field name indicators, such as field name indicator 430, may be moved from one field definition input control 424 to another field definition input control 424, thus associating the corresponding field name with a new index position. In this manner, a user may modify the ordering data of a template, effectively redefining the fields that will be generated from the template.

Figure 4B:
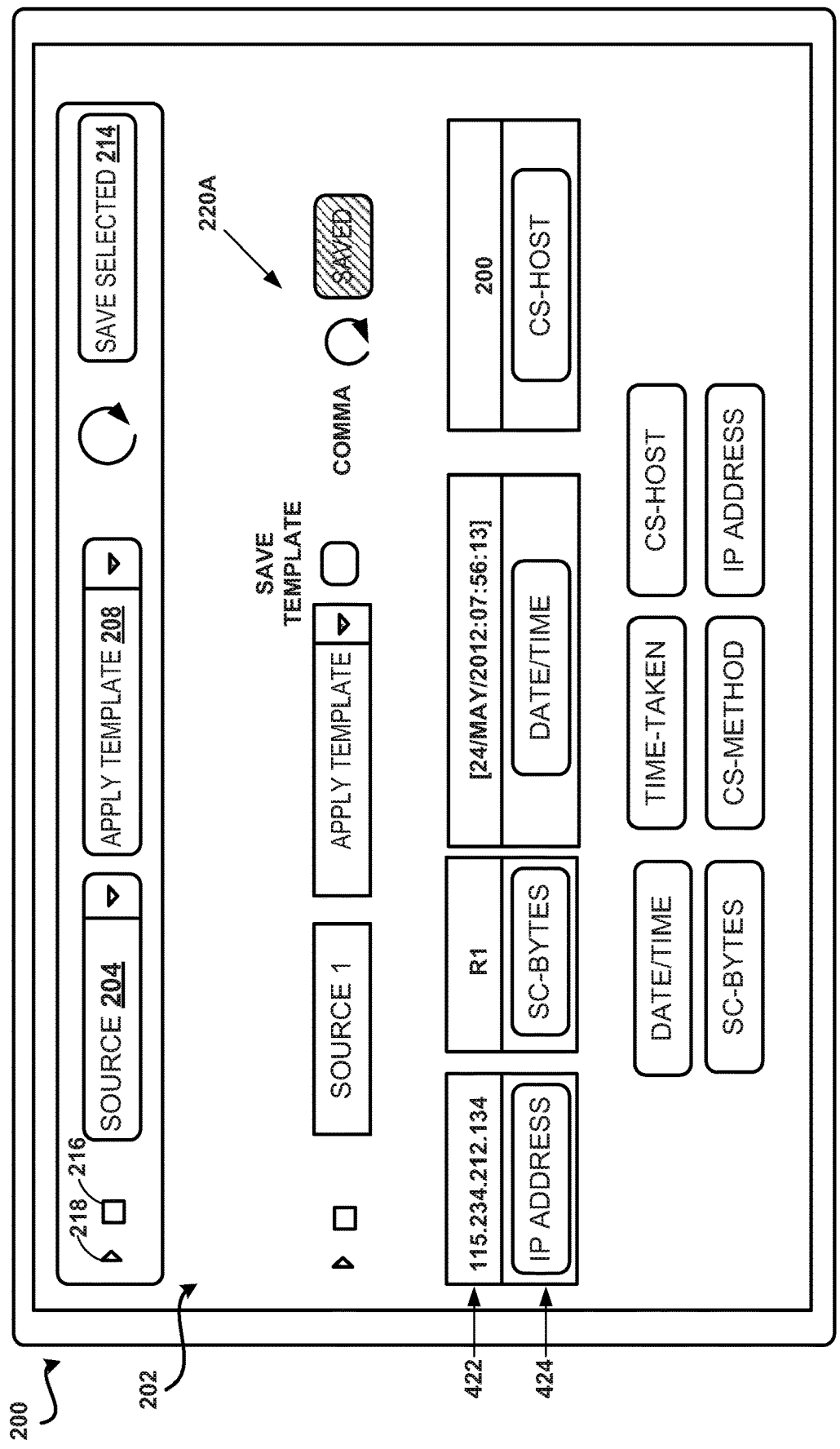

FIG. 4B is an illustration of the display 200 in which example field have been defined. In FIG. 4B, each field name input control 424 has received input specifying a field to associate with the corresponding index position.

In an embodiment, interactions with the field preview area 420 and/or other elements of interface 202 modify a template, and thus effectively create a new template. A user may save this template at any time using save template control 480. The template may then be accessible in the future, for instance, in template selection control 208. In an embodiment, however, a user need not actually save a new template. Rather, a user may select control 214 at any time to generate and save field definition data based upon the data shown in row 420, whether or not the template effectively defined therein has been permanently saved. In an embodiment, interface 202 further includes a reversion control 485 to roll-back any modifications to the template currently specified by the local template selection control 204B.

Figure 5:
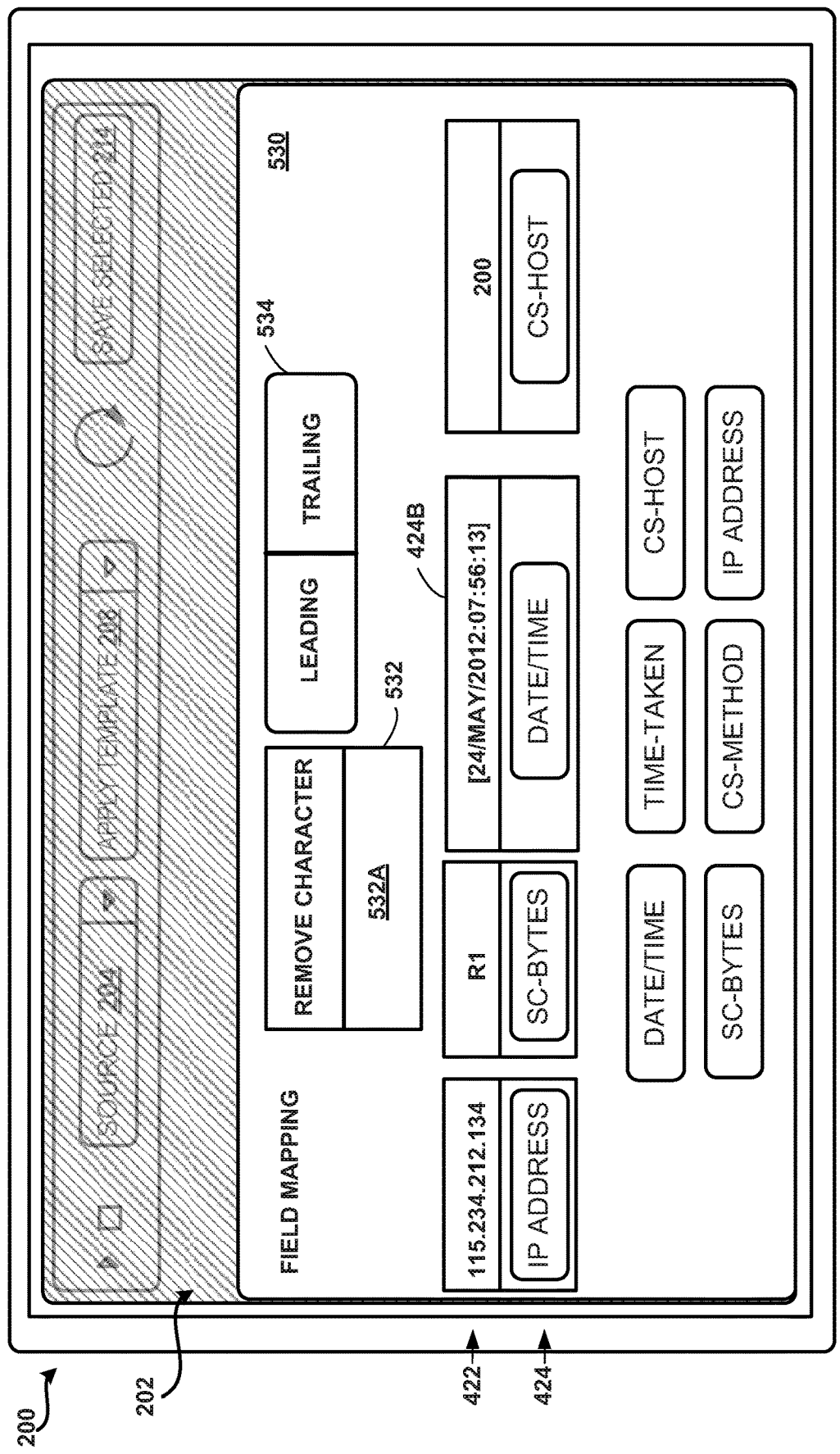
FIG. 5 is an interface diagram showing aspects of an interface through which a user may remove one or more characters from data in a field, in accordance with some embodiments.

FIG. 5 is an illustration of the display 200 in which a user may modify a field definition to include a post-processing instruction, according to an embodiment. While a variety of post-processing instructions may be given through an interface such as interface 202, FIG. 5 specifically depicts controls for causing the removal of one or more characters from the chunks that will be extracted for a given field. In some configurations, each chunk that will be extracted for a field may include one or more characters that a user may want or need to remove. For example, machine data for a particular field may include leading and trailing characters such as a bracket, hyphen, and the like. Using the removal feature, the field definition for a chunk is updated to include a post-processing instruction that derives a final value for the field that does not include the removed characters.

The removal of a leading or trailing character, as described below, is merely one example of a post-processing instruction. This example is not intended to limit the scope of the present disclosure. For example, an interface may provide other controls for modifying field definitions, such as an control enabling the user to concatenate two fields into one field or to separate one field into two fields.

To provide a user with the ability to modify or establish a field definition which includes the removal of one or more leading or trailing characters, character removal control 530 may be provided. The character remove control 530 may be initiated using various technologies, including a selection of a particular field. For example, the character removal control 530 may be initiated if a field 425 of the representative event data 422 is selected. When selected, a character input control 532 and a leading/trailing input 534 may be initiated.

The character input control 532 may be used to input the number of characters to instruct the data server to remove. The character input control 532 may include a character input field 532A, which may be configured to receive an input from a user identifying the number of characters to remove. In another configuration, the character input field 532A may be pre-populated with an expected value. In a still further configuration, the character input field 532A may be populated when an input is received from a user identifying one of the characters in the field 425. These and other configurations are considered to be within the scope of the present disclosure.

In the example illustrated in FIG. 5, a user may want to remove the leading and trailing brackets of the data in the field 424B, "[24/MAY/2012:07:56:13]." The representative data indicates that the representative data for the field 425 has one character (the bracket). The character input field 532A may receive an input of "1" from the user signifying the number of characters to remove. When a user inputs the number, the "LEADING" input of the leading/trailing input 534 may be selected. This identifies the location of the character to remove. In a similar manner, the character input field 532A may receive an input of "1" identifying one trailing character to remove. The "TRAILING" input of the leading/trailing input 534 may be selected to remove the trailing bracket from the data in the field 524B. The field definition for the field 425 will include, along with the field label, the position of the field, and the delimiter, the removal of one leading and one trailing character. When complete, the display 200 as illustrated in FIG. 5 may return to a configuration such as the display 200 illustrated in FIG. 3.

A field definition may include other data. For example, a field may be defined using an algorithm. An algorithm may be applied to a field that defines the field if one condition is met and defines the field in another way if a different condition is met. In one configuration of the present example, a field may be defined as "HIGH" if the field value is above a numerical value and may be defined as a "LOW" if the field value is at or below the numerical value. In this manner, the field definition may be dynamic field definition, which is based on the value of the field rather than a static field definition applied to the field irrespective of the value in the field. The field may also be defined based on field values of one or more second fields. For example, a field may be defined as PRIORITY if a field defined as TIME has a certain value and NON-PRIORITY if the field defined as TIME has a different value. The present disclosure may include these and other field definition technologies.

4.2. Method for Using a Field Definition Interface

Figure 6:
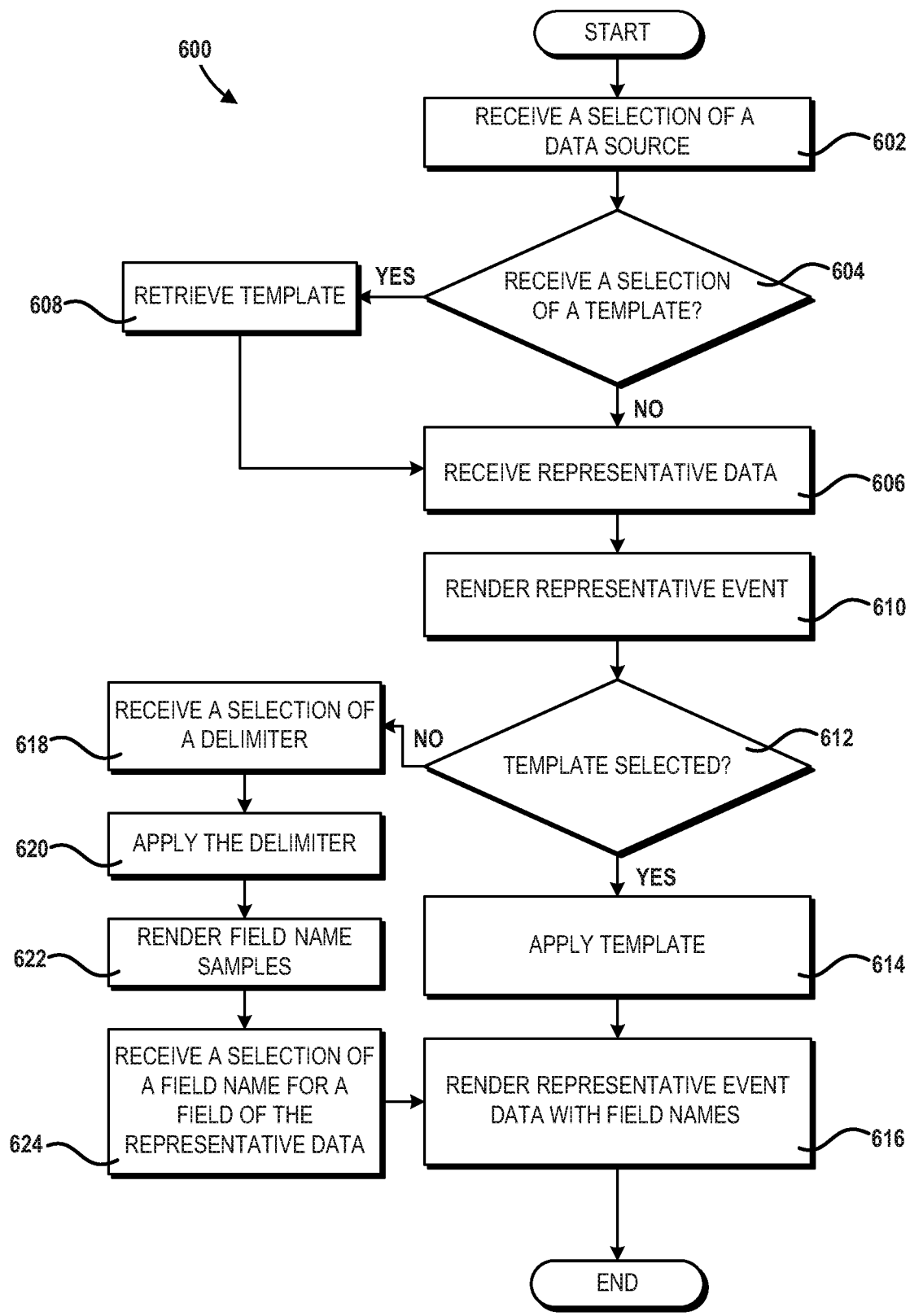
FIG. 6 is a flow diagram showing aspects of a method for defining fields, in accordance with some embodiments.

FIG. 6 is a flow diagram showing aspects of a method 600 for defining fields in data items, such as unstructured data from an unstructured data source, in accordance with some embodiments. FIG. 6 is an example of a method for defining fields using an interface, such as field definition interface 1145. Other methods may involve additional or fewer elements in varying arrangements. Moreover, the specific details of the interface involved in the method 600 are for illustrative purposes. Other interfaces may include additional or fewer elements, in varying arrangements.

The method 600 begins and proceeds to operation 602, where a selection of a data source is received. The selection may be received using an input at the source input control 204 or the source input control dropdown list 204A. The selection may also be received at the local source input control 204B.

The method 600 proceeds from operation 602 to operation 604, where a determination is made as to whether or not a template selection is received. The template selection may be received at the template selection control 208 or the template selection control dropdown list 208A, which may include one or more templates for selection. The templates rendered for selection may be previously used templates or may be templates selected for possible use depending on the source type or source of the data.

If a selection of a template is not received, the method 600 proceeds from operation 604 to operation 606, where representative data is rendered. The representative data may be a random selection of one or more of the data items provided by the selected source, may be the first data item received from the selected source, or may be different data items depending on the particular configuration. The representative event data does not need to be actual data, as the selected source may be configured to transmit "dummy" data for purposes of defining the fields.

If a selection of a template is received at operation 604, the method 600 proceeds to operation 608, where the selected template is retrieved. The template may be saved in various locations. The method proceeds from operation 608 to operation 606, as described above.

From operation 606, the method 600 proceeds to operation 610, where the representative data received in operation 606 is rendered. The representative data may be rendered using the field preview area 420. The field preview area 420 may be expanded to show the representative event data. The field preview area 420 may also include the field name input controls 424, which may be used to receive an input of a definition of a particular field.

From operation 610, the method 600 proceeds to operation 612, where a determination is made as to whether or not a template was selected in operation 604. If a template was selected, the method proceeds from operation 612 to operation 614, where the selected template is applied to the representative data.

If a template was not selected, the method 600 proceeds to operation 618, where a selection of a delimiter is received. The delimiter may be used to separate the data into its constituent chunks. If the delimiter is known to the user, the user may select the known delimiter. If the delimiter is unknown, the user may need to rotate through several delimiters to determine which delimiter is best used with the data. In some configurations, a user may need to specify a delimiter if the delimiter is not a selectable delimiter rendered in the delimiter control 210. The method 600 proceeds from operation 618 to operation 620, where the selected delimiter of operation 618 is applied to the representative data.

The method 600 proceeds from operation 620 to operation 622, where field labels are rendered in the field name indicators 426. The field name indicators 426 may be provided in various ways, the present disclosure of which is not limited to any particular manner. For example, the field name indicators 426 may be generated using information from other field definition operations.

The method 600 proceeds from operation 622 to operation 624, where a selection of one of the field name indicators 426 for a particular chunk of the representative data is received. The field name indicators 426 may be applied using other technologies, such as, but not limited to, keyword input.

From operations 624 or 614, the method 600 proceeds to operation 616, where the representative data is rendered with field definitions applied at operation 614, if a template is selected at operation 604, or operation 624, if no template is selected at operation 604. The data server system may thereafter search data items using the field definitions applied in operation 616. The field definitions may be applied at search time or at other times, as described above. The method 600 then proceeds from operation 616 to operation 618, where it ends.

5.0. Example Embodiments

According to an embodiment, a system for practicing the techniques described herein comprises a data repository, stored on one or more storage devices, configured to store data items. The system further comprises a field extractor configured to derive values from the data items for specified fields by applying field extraction rules associated with the specified fields to the data items. Each field extraction rule associates a name of a field with one or more instructions for locating, in a data item, a chunk of the data item that corresponds to the field, and for deriving a value for the field from the located chunk. The system further comprises a data server, implemented by one or more computing devices and coupled to the data repository. The data server is configured to execute search queries that reference particular fields based on values derived by the field extractor for the particular fields. The system further comprises a template repository comprising field extraction templates. Each field extraction template comprises a set of field names and ordering data that associates at least some of the field names in the set with different index positions. The system further comprises a field extraction rule generator configured to generate at least some of the field extraction rules, including one or more particular field extraction rules. The one or more particular field extraction rules are generated based at least on: the ordering data from a specified template in the template repository, one or more field names from the specified template, and a specified delimiter. The specified delimiter indicates how to segment a given data item into an ordered set of data chunks, with each of the data chunks associated with a different index position.

In an embodiment, the system further comprises a knowledge base comprising stored field extraction rules. The field extraction rule generator is further configured to store generated field extraction rules in the knowledge base. The data server is further configured to, when processing a query that references a particular field name for a particular field, locate a particular field extraction rule that is associated with the particular field name within the knowledge base, and cause the field extractor to apply the particular field extraction rule to at least some of the data items. In an embodiment, the field extraction rule generator is further configured to generate at least a particular field extraction rule based on at least one transformation instruction associated with a particular field name. The transformation instruction indicates to perform at least one of: converting a corresponding chunk of a data item to a different format, truncating the corresponding chunk of the data item, or applying a formula to the corresponding chunk of the data item. The one or more instructions of a particular field extraction rule include the transformation instruction.

In an embodiment, the system further comprises a field definition interface generator configured to generate a field definition interface for defining fields. The field definition interface includes input controls configured to receive inputs selecting a template from the template repository and a delimiter to associate with the template. In an embodiment, the field definition interface includes: a template selection control configured to receive template selection input selecting a template from the template repository, and a delimiter selection control configured to receive delimiter selection input selecting a delimiter to associate with the template. The field definition interface generator is further configured to segment a sample data item into an array of sample data chunks based on a selected delimiter and identify which of the sample data chunks correspond to which of the field names in a selected template based on the ordering data in the selected template. In an embodiment, the field definition interface generator is further configured to update the field definition interface to display sample chunk preview components that display sample data chunks, field name preview components that display field names in the selected template, and a field name preview component for a particular field name being displayed in association with an sample chunk preview component for an sample chunk that corresponds to the particular field name.

In an embodiment, the field definition interface further includes one or more controls for receiving ordering input that modifies the ordering data to associate a field name in the selected template with a different index position. The field extraction rule generator is further configured to generate a field extraction rule based on the field names in the specified template, the modified ordering data from the specified template, and the specified delimiter. In an embodiment, the ordering input indicates that a user has dragged a particular field name preview component for a particular field name to a particular sample chunk preview component in order to associate the particular field name with a particular index position of the particular sample chunk preview component. In an embodiment, the particular field name is one of the field names in the specified template, and, prior to the ordering input, the particular field name was not associated with any index position.

In an embodiment, the field definition interface includes a data source selection control configured to receive data source selection input that selects a set of data items. The field definition interface generator is configured to select the sample data item from a particular set of data items selected by the data source selection input. In an embodiment, the field definition interface generator is configured to select the sample data item from the particular set of data items based on determining that the sample data item, when segmented into an array of data chunks, has an interesting value for one or more of the data chunks.

In an embodiment, the field definition interface includes: controls for receiving template modification inputs to perform one or more of: create new field names, modify the ordering data within the selected template, and/or define transformations to associate with certain field names; and a control for saving a new template in the template repository based on the template modification inputs. In an embodiment, a particular template in the template repository specifies at least two field names. The field extraction rule generator is configured to create at least two different field extraction rules for the at least two field names based on the particular template. In an embodiment, a particular template comprises delimiter specification data that selects a particular delimiter to associated with the particular template.

In an embodiment, the delimiter is a set of one or more characters. In an embodiment, based on a particular field name from a particular template, a particular delimiter associated with the particular template, and a particular index position to which the ordering data of the particular template assigns the particular field name, the field extraction rule generator is configured to generate a particular extraction rule. In an embodiment, the particular extraction rule instructs the data server to, for each data item of a plurality of data items: split the data item into an array of chunks, each chunk at least partially bound within the data item by the particular delimiter, and extract, as the value of the data item for the particular field, a particular chunk from the array that is at the particular index position within the array. In an embodiment, the particular extraction rule instructs the data server to, for each data item of a plurality of data items: split the data item into an array of chunks, each chunk at least partially bound within the data item by the particular delimiter, extract a particular chunk from the array that is at the particular index position within the array, and derive the value of the data item for the particular field by applying the transformation rule to the particular chunk.

In an embodiment, the data items include time-stamped events that were stored without a pre-defined schema that defines the fields associated with the field extraction rules.

In an embodiment, the field extraction rule generator is further configured to, responsive to the data server processing a query that references a particular field name for a particular field, dynamically generate a particular field extraction rule associated with the particular field name based on a particular template whose set of field names comprises the particular field name, and a particular delimiter specified for the particular template. In an embodiment, a particular search query identifies a particular template and a particular delimiter. The data server is further configured to request that the field extraction rule generator dynamically generate one or more field extraction rules based on the particular template and the particular delimiter. The data server is further configured to execute the query, in part, based on values derived using the dynamically generated one or more field extraction rules.

According to an embodiment, a method comprises: identifying a field extraction template to apply to data items in a data repository, the field extraction template comprising ordering data for a set of field names, the ordering data associating the field names with different index positions; identifying a delimiter for segmenting the data items into ordered sets of data chunks; generating field definition data defining a field that has a particular field name from the set of field names, the field definition data comprising a rule for deriving values for the field from the data items, the rule being based on the identified delimiter and a particular index position associated with the field name in the ordering data; executing a query that references the particular field name, the executing comprising using the rule to derive values for the field from at least a set of the data items, the deriving comprising, for each data item in the set of data items, segmenting the data item into an array of data chunks based on the delimiter, and identifying a value to derive based on a data chunk located at the particular index position.

In an embodiment, the data items are time-stamped events. In an embodiment, the field was not a pre-defined field for the data items at a time when at least some of the data items were originally stored, the data items having been stored in an original storage format. The values are derived from the data items within the data repository without having modified the data items from the original storage format to reflect the field definition data.

In an embodiment, identifying the field extraction template comprises receiving, in a user interface, first input that selects the field extraction template from a plurality of available templates, the plurality of available templates including at least two templates with different sets of field names and different ordering data. Identifying the delimiter comprises receiving second input, in the user interface, that defines the delimiter. In an embodiment, the method further comprises providing controls, within the user interface, for receiving third inputs that define post-processing instructions to associate with at least some of the field names in the identified field extraction template; and based on a particular third input, including within the rule a post-processing instruction to derive values for the field by applying one or more operations to any located data chunks. In an embodiment, the method further comprises providing controls, within the user interface, for receiving third inputs that request to perform one or more of: create a new field name, modify the ordering data, or save a new field extraction template. In an embodiment, the second input selects the delimiter from a set of specified characters or groups of characters.

In an embodiment, the method further comprises: saving the rule in a knowledge base responsive to the first input and the second input; and reading the rule from the knowledge base responsive to determining that the query references the field name.

In an embodiment, identifying the field extraction template and/or identifying the delimiter are performed based on instructions in the query. In an embodiment, the query specifies the field extraction template and/or the delimiter. In an embodiment, the query specifies the particular field name. Identifying the field extraction template comprises determining that the particular field name is found in the field extraction template.

In an embodiment, the method further comprises, based on the same identified delimiter and the same identified template, generating field definition data for a plurality of fields, and determining how to derive data for each field in the plurality of fields based on the field definition data.

In an embodiment, the method further comprises: receiving first input that selects a set of data items; identifying at least one sample event from the set of data items; segmenting the at least one sample event into a ordered set of sample chunks based on the identified delimiter; causing display of a preview of how the sample event is segmented based on the identified delimiter, the preview further comprising field name indicators indicating one or more of the field names, from the identified template, that would be associated with one or more of the sample chunks, based on the ordering data; causing display of one or more controls for receiving order modification input to modify the ordering data by rearranging field name indicators to be associated with different sample chunks; and responsive to receiving order modification input that associates a second field name of the identified template with a sample chunk at a new index position, generating a second rule for deriving values for a second field from the data items, the second rule being based on the identified delimiter and the new index position.

In an embodiment, the set of field names is a first set of field names. The template further includes a second set of field names for which the ordering data in the template does not indicate index positions. The method further comprises receiving input that assigns a second field name in the second set of field names to a second index position.

In an embodiment, the rule further comprises a post-processing instruction to derive values for the field by applying one or more operations to any located data chunks. In an embodiment, the one or more operations include one or more of: truncating a data chunk, applying a formula to a data chunk, or converting a data chunk to a different format.

According to one aspect presented herein, a selection of an unstructured data source is received and representative event data is rendered based on the selection of the unstructured data source. A selection of a delimiter is received. The delimiter may be used to separate the representative event data into its constituent components. A plurality of field labels may be rendered and a selection of a field label for a first field chunk of the plurality of field chunks may be received. Further, in some configurations, a determination of a field definition corresponding to the first field chunk of the plurality of field chunks may be made. In further configurations, the field definition may include the delimiter, the field label and a position of the field chunk in the representative event data. A search engine may use the field definition to search other event data from the unstructured data source.

According to an embodiment, a computer-implemented method for defining a field of unstructured data from an unstructured data source comprises: receiving a selection of an unstructured data source to provide unstructured data; rendering representative event data from the unstructured data source; receiving a selection of a delimiter; applying the delimiter to separate the representative event data into a plurality of field chunks; rendering a plurality of field labels; receiving a selection of a field label for a first field chunk of the plurality of field chunks; and determining a field definition corresponding to the first field chunk of the plurality of field chunks, the field definition comprising the delimiter, the field label and a position of the field chunk in the representative event data, wherein a search engine may use the field definition to search other event data from the unstructured data source.

In an embodiment, the representative event data comprises at least one of a random event provided by the unstructured data source, a first event data provided by the unstructured data source, and dummy data representative of an event from the unstructured data source. In an embodiment, wherein receiving a selection of a field label for a first field chunk of the plurality of field chunks comprises receiving a drag and drop input of the field label from the plurality of field labels. In an embodiment, receiving a selection of a field label for a first field chunk of the plurality comprises receiving a keyword input in a field definition input user interface.

In an embodiment, the method further comprises rendering a character removal user control configured to receive an input of a number of leading or trailing characters to remove from data of the first field chunk, wherein the field definition further comprises the input of the number of leading or trailing characters to remove. In an embodiment, the method further comprises rendering a template selection user control configured to receive an input of a selection of a template to apply to event data of the unstructured data source, the template comprising a set of field definitions for event data from the unstructured data source.

In an embodiment, the plurality of field labels are associated with a template, are generated from other uses of similar data to the data from the unstructured data source or are generated based on the identification of a user, role, domain or algorithm. In an embodiment, the method further comprises rendering a template selected for the unstructured data source in a color reserved for the template.

According to an embodiment, a method comprises receiving a selection of a delimiter; segmenting a representative event derived from data of a data source into one or more subsets of data based at least in part on the selected delimiter; rendering the representative event, wherein the rendering includes an identification of the one or more subsets of data; receiving a field name for a subset of data; generating a field corresponding to the received field name, the field including the subset of data for which the field name has been received in the representative event and subsets of data at equivalent ordinal positions defined by the selected delimiter in other events derived from the data source; and using the field to constrain a search of events derived from the data source.

In an embodiment, the data of the data source includes at least one of: structured data, unstructured data, semi-structured data, time-series data, time-series machine data, and machine data. In an embodiment, the representative event comprises at least one of: a random event derived at least in part from data of the data source, a first event derived at least in part from the data of the data source, and a dummy data representative of an event derived at least in part from the data of the data source.

In an embodiment, receiving the field name for the subset of data comprises receiving a drag and drop input of the field name. In an embodiment, the method further comprises displaying a plurality of field names, wherein receiving the field name for the subset of data includes receiving a selection of a field name from the display of the plurality of field names.

In an embodiment, receiving the field name for the subset of data comprises receiving a keyword input. In an embodiment, the method further comprises rendering a character removal user control configured to receive an input of a number of leading or trailing characters to remove from the subset of data, wherein the field does not include a number of leading or trailing characters removed from the subset of data using the character removal user control.

In an embodiment, the method further comprises rendering a template selection user control configured to receive an input of a selection of a template of a plurality of templates, the template specifying one or more fields that should be defined for events derived from data of the data source when the template is selected for application to that data source. In an embodiment, the method further comprises rendering a plurality of field names, wherein the receiving of the field name for the subset of data includes receiving a selection of a field name from the plurality of field names, wherein each of the plurality of field names is associated with one of a plurality of templates, and wherein the plurality of field names are generated from other uses of similar data to the data of the data source, or are generated based on an identification by at least one of a user, a role, a domain, and an algorithm. In an embodiment, the method further comprises displaying identifiers for two identical templates in a same color.

6.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
causing a user interface to be displayed that displays a list of a plurality of templates, each template of the plurality of templates including a set of rules for parsing fields from log files, each of the log files including raw data corresponding to a data item of a set of data items;
receiving a selection of a particular template from the list of the plurality of templates;
identifying at least one sample data item;
causing display of a preview of a set of field values with associated field names, the preview graphically depicting a segmentation of the set of field values with the associated field names, the set of field values and the associated field names parsed from the at least one sample data item using index positions and delimiters corresponding to respective associated field names included in a respective set of rules of the particular template;
causing display of a post-processing control;
receiving an input, via the post-processing control, to define a post-processing instruction in association with a particular field corresponding with a field value of the set of field values;
based on receiving the input, updating the particular template to create an updated rule from among the respective set of rules that is associated with the particular field corresponding with the field value, the updated rule including the post-processing instruction.

2. The method of claim 1, further comprising:
extracting field values from the set of data items using the respective set of rules for parsing fields from log files included in the updated particular template; and
executing a search across the extracted field values.

3. The method of claim 1, further comprising:
extracting field values from the set of data items using the respective set of rules for parsing fields from log files included in the updated particular template;
executing a search across the extracted field values to obtain a search result; and
causing display of information relating to the search result.

4. The method of claim 1, wherein the displayed associated field names are determined based on an analysis of the log files.

5. The method of claim 1, wherein the segmentation is based on the delimiters corresponding to the respective associated field names included in the respective set of rules of the particular template for segmenting the set of data items into ordered sets of data chunks.

6. The method of claim 1, wherein the post-processing rule includes at least one of removing one or more leading characters or removing one or more trailing characters.

7. The method of claim 1, wherein the plurality of templates are selected to be displayed based on a source of the set of data items.

8. The method of claim 1, wherein the set of data items are time-stamped events.

9. The method of claim 1, further comprising:
causing display of a graphical control for reordering one or more of the associated field names;
receiving an input that reassigns at least one associated field name of the respective associated field names to at least one different field value of the set of field values, the input received using the graphical control; and based on the receiving the input, updating the particular template to create an updated rule among the respective set of rules that is associated with the at least one reassigned associated field name, the updated rule including an updated index position and an updated delimiter corresponding to the at least one different field value, the updated rule being applied to the set of data items when a search query is executed that references the at least one reassigned associated field name.

10. The method of claim 1, wherein the updated rule includes removing of one or more characters associated with the particular field.

11. The method of claim 1, wherein the updated rule includes at least one of concatenating two fields into one field or separating one field into two fields.

12. The method of claim 1, wherein the post-processing control is displayed based on selection of the particular field.

13. The method of claim 1, wherein the post-processing control includes a character input control used to input a number of characters to remove.

14. The method of claim 1, wherein the post-processing control includes a character input control used to input a number of characters to remove, wherein the character input control includes a character input field having number of characters to remove is pre-populated with an expected value.

15. The method of claim 1, wherein the post-processing control includes a character input control used to input a number of characters to remove, wherein the character input control includes a character input field having the number of characters to remove being populated based on received input indicating one or more of characters in the particular field.

16. The method of claim 1, wherein the post-processing control includes a character input control used to indicate a number of characters to remove and a leading/trailing input used to indicate whether the number of characters to remove are in the leading portion of the trailing portion.

17. One or more non-transitory computer-readable medium, storing one or more sequences of instructions, wherein execution of the one or more sequences of instructions by one or more processors causes the one or more processors to perform:

causing a user interface to be displayed that displays a list of a plurality of templates, each template of the plurality of templates including a set of rules for parsing fields from log files, each of the log files including raw data corresponding to a data item of a set of data items;

receiving a selection of a particular template from the list of the plurality of templates;

identifying at least one sample data item;

causing display of a preview of a set of field values with associated field names, the preview graphically depicting a segmentation of the set of field values with the associated field names, the set of field values and the associated field names parsed from the at least one sample data item using index positions and delimiters corresponding to respective associated field names included in a respective set of rules of the particular template;

causing display of a post-processing control;

receiving an input, via the post-processing control, to define a post-processing instruction in association with a particular field corresponding with a field value of the set of field values;

based on receiving the input, updating the particular template to create an updated rule from among the respective set of rules that is associated with the particular field corresponding with the field value, the updated rule including the post-processing instruction.

18. The one or more non-transitory computer-readable medium of claim 17, wherein the post-processing control includes a character input control used to indicate a number of characters to remove and a leading/trailing input used to indicate whether the number of characters to remove are in the leading portion of the trailing portion.

19. An apparatus, comprising:

one or more processors; and one or more memory devices storing instructions, which when executed by the one or more processors, cause the one or more processors to:

cause a user interface to be displayed that displays a list of a plurality of templates, each template of the plurality of templates including a set of rules for parsing fields from log files, each of the log files including raw data corresponding to a data item of a set of data items;

receive a selection of a particular template from the list of the plurality of templates;

identify at least one sample data item;

cause display of a preview of a set of field values with associated field names, the preview graphically depicting a segmentation of the set of field values with the associated field names, the set of field values and the associated field names parsed from the at least one sample data item using index positions and delimiters corresponding to respective associated field names included in a respective set of rules of the particular template;

cause display of a post-processing control;

receive an input, via the post-processing control, to define a post-processing instruction in association with a particular field corresponding with a field value of the set of field values;

based on receiving the input, update the particular template to create an updated rule from among the respective set of rules that is associated with the particular field corresponding with the field value, the updated rule including the post-processing instruction.

20. The apparatus of claim 19, wherein the updated rule includes removing of one or more characters associated with the particular field.

* * * * *